US010945199B2

(12) United States Patent
Omiya et al.

(10) Patent No.: US 10,945,199 B2
(45) Date of Patent: Mar. 9, 2021

(54) VEHICLE-MOUNTED GATEWAY APPARATUS AND VEHICLE MOUNTED GATEWAY SYSTEM

(71) Applicants: KABUSHIKI KAISHA TOSHIBA, Minato-ku (JP); TOSHIBA DIGITAL SOLUTIONS CORPORATION, Kawasaki (JP)

(72) Inventors: Masayuki Omiya, Kawasaki (JP); Kazuhiro Gotou, Higashimurayama (JP); Masashi Uemoto, Fuchu (JP); Daichi Soshi, Chofu (JP); Kazunori Hashimoto, Kodaira (JP); Hirokazu Ikeyama, Setagaya (JP); Yousuke Ujihara, Koshigaya (JP); Satoru Iwahashi, Minato (JP); Akifumi Ohno, Koto (JP); Kei Sakamoto, Chuo (JP); Ken Ishii, Chofu (JP); Shion Itou, Kawasaki (JP)

(73) Assignees: KABUSHIKI KAISHA TOSHIBA, Minato-ku (JP); TOSHIBA DIGITAL SOLUTIONS CORPORATION, Kawasaki (JP)

(*) Notice: Subject to any disclaimer, the term of this patent is extended or adjusted under 35 U.S.C. 154(b) by 158 days.

(21) Appl. No.: 16/303,931

(22) PCT Filed: May 23, 2017

(86) PCT No.: PCT/JP2017/019286
§ 371 (c)(1),
(2) Date: Nov. 21, 2018

(87) PCT Pub. No.: WO2017/204232
PCT Pub. Date: Nov. 30, 2017

(65) Prior Publication Data
US 2020/0245234 A1    Jul. 30, 2020

(30) Foreign Application Priority Data
May 24, 2016    (JP) ............................. JP2016-103491

(51) Int. Cl.
*H04L 12/40* (2006.01)
*H04W 48/18* (2009.01)
(Continued)

(52) U.S. Cl.
CPC ............. *H04W 48/18* (2013.01); *H04L 12/40* (2013.01); *H04W 4/44* (2018.02); *H04W 24/08* (2013.01); *H04L 2012/40215* (2013.01)

(58) Field of Classification Search
CPC ....... H04W 48/18; H04W 24/08; H04W 4/44; H04L 12/40; H04L 2012/40215
See application file for complete search history.

(56) References Cited

U.S. PATENT DOCUMENTS

| 6,396,164 B1 | 5/2002 | Barnea et al. |
| 2009/0082928 A1* | 3/2009 | Witkowski ............. H04L 67/14 701/49 |

(Continued)

FOREIGN PATENT DOCUMENTS

| EP | 1 515 496 A2 | 3/2005 |
| JP | 2008-298490 A | 12/2008 |

(Continued)

OTHER PUBLICATIONS

International Search Report dated Aug. 15, 2017, in PCT/JP2017/019286, filed May 23, 2017.

*Primary Examiner* — Lakeram Jangbahadur
(74) *Attorney, Agent, or Firm* — Oblon, McClelland, Maier & Neustadt, L.L.P.

(57) ABSTRACT

A vehicle-mounted gateway apparatus according to an embodiment includes a communication device including an external communication interface for connection to the network outside the mobile body with each of a plurality of different external communication schemes and an internal communication interface for connection to each of the plurality of data sources within the mobile body; and a control device configured to transmit data collected from each of the data sources through the internal communication interface to the network outside the mobile body. The (Continued)

control device includes a communication channel selection section configured to select a communication channel from the plurality of external communication schemes for each of the data sources, and a monitoring control section configured to monitor data output from each of the data sources and to transmit the data to the network outside the mobile body over a selected one of the communication channels associated with the data source. The communication channel selection section is configured to switch between the communication channels associated with each of the data sources depending on a communication connection state of each of the plurality of external communication schemes based on priority setting in which the plurality of external communication schemes are arranged in a predetermined priority order.

9 Claims, 13 Drawing Sheets

(51) Int. Cl.
*H04W 4/44* (2018.01)
*H04W 24/08* (2009.01)

(56) References Cited

U.S. PATENT DOCUMENTS

| | | | |
|---|---|---|---|
| 2012/0106550 A1* | 5/2012 | Yousefi | H04W 4/44 370/392 |
| 2012/0302275 A1* | 11/2012 | Junell | H04W 48/18 455/514 |
| 2013/0154298 A1* | 6/2013 | Ricci | B60K 37/06 296/37.12 |
| 2014/0100740 A1* | 4/2014 | Chutorash | H04M 1/6075 701/36 |
| 2014/0380240 A1 | 12/2014 | Rankin et al. | |

FOREIGN PATENT DOCUMENTS

| | | |
|---|---|---|
| JP | 2009-260540 A | 11/2009 |
| JP | 2012-249107 A | 12/2012 |
| JP | 2014-142864 A | 8/2014 |
| WO | WO 2009/073806 A2 | 6/2009 |

\* cited by examiner

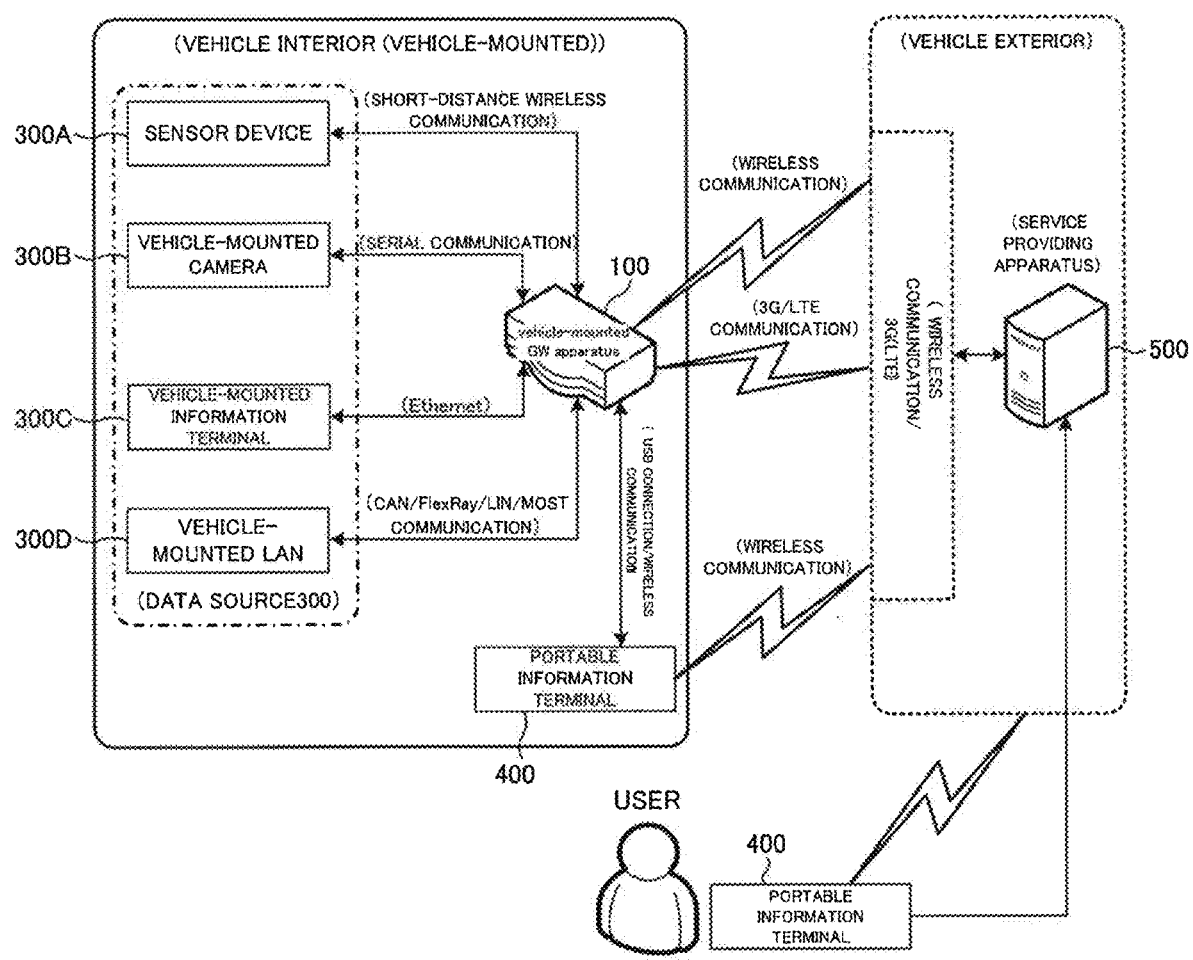
[FIG1]

[FIG2]
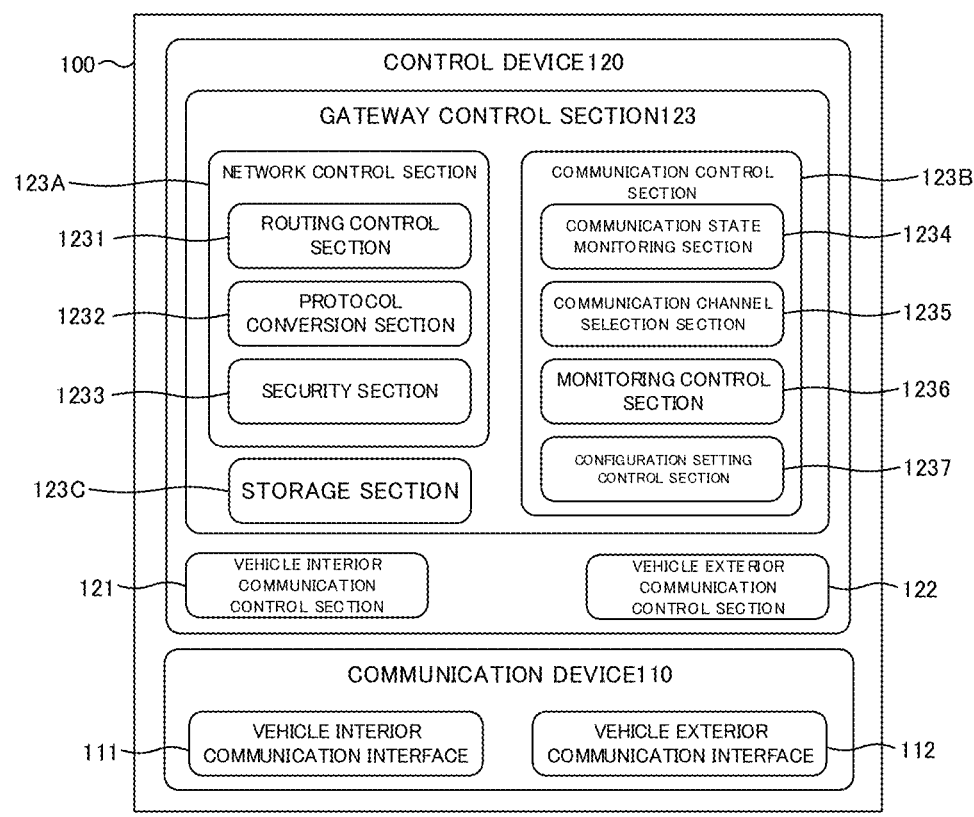

[FIG3]

(COMMUNICATION CONNECTION CONFIGURATION SETTING INFORMATION)

| SETTING ITEM | SETTING DETAILS | SETTING VALUE |
|---|---|---|
| SETTING OF COMMUNICATION SCHEME | COMMUNICATION CHANNEL PRIORITY SETTING FOR CONFIGURATION SETTING | WI-FI, PORTABLE INFORMATION TERMINAL, 3G/LTE, AUTOMATIC, NOT SET. DEGREES OF PRIORITY IN "AUTOMATIC" SETTING: WIFI > INFORMATION TERMINAL > 3G/LTE. |
| | COMMUNICATION CHANNEL PRIORITY SETTING FOR LARGE-SCALE DATA DELIVERY | WI-FI, PORTABLE INFORMATION TERMINAL, 3G/LTE, AUTOMATIC, NOT SET. DEGREES OF PRIORITY IN "AUTOMATIC" SETTING: WIFI > INFORMATION TERMINAL > 3G/LTE. |
| | COMMUNICATION CHANNEL PRIORITY SETTING FOR VITAL INFORMATION UPLOAD | WI-FI, PORTABLE INFORMATION TERMINAL, 3G/LTE, AUTOMATIC, NOT SET. DEGREES OF PRIORITY IN "AUTOMATIC" SETTING: WIFI > INFORMATION TERMINAL > 3G/LTE. |
| | COMMUNICATION CHANNEL PRIORITY SETTING FOR VEHICLE INFORMATION UPLOAD | WI-FI, PORTABLE INFORMATION TERMINAL, 3G/LTE, AUTOMATIC, NOT SET. DEGREES OF PRIORITY IN "AUTOMATIC" SETTING: WIFI > INFORMATION TERMINAL > 3G/LTE. |
| | COMMUNICATION CHANNEL PRIORITY SETTING FOR IMAGING INFORMATION UPLOAD | WI-FI, PORTABLE INFORMATION TERMINAL, 3G/LTE, AUTOMATIC, NOT SET. DEGREES OF PRIORITY IN "AUTOMATIC" SETTING: WIFI > INFORMATION TERMINAL > 3G/LTE. |
| | COMMUNICATION CHANNEL PRIORITY SETTING FOR LOG INFORMATION UPLOAD | WI-FI, PORTABLE INFORMATION TERMINAL, 3G/LTE, AUTOMATIC, NOT SET. DEGREES OF PRIORITY IN "AUTOMATIC" SETTING: WIFI > INFORMATION TERMINAL > 3G/LTE. |
| SETTING OF 3G/LTE COMMUNICATION USAGE | SET VALID/INVALID OF 3G/LTE COMMUNICATION | ON, OFF. |
| SETTING OF WI-FI COMMUNICATION USAGE | SET VALID/INVALID OF WI-FI COMMUNICATION | ON, OFF. |
| SETTING OF INFORMATION TERMINAL USAGE | SET VALID/INVALID OF INFORMATION TERMINAL WI-FI | ON, OFF. |
| | SET VALID/INVALID OF INFORMATION TERMINAL USB | ON, OFF. |
| REGISTRATION OF SERVICE PROVIDING APPARATUS | SET SERVICE PROVIDING APPARATUS TO BE CONNECTED. DIFFERENT SERVICE PROVIDING APPARTAUS CAN BE SET FOR EACH DATA SOURCE OR SERVICE PROVIDING APPARATUSES CAN BE SET FOR ONE DATA SOURCE | SPECIFY URL OF SERVICE PROVIDING APPARATUS |

[FIG4]

(VEHICLE-MOUNTED LAN CONFIGURATION SETTING INFORMATION)

| SETTING ITEM | SETTING DETAILS | SETTING VALUE |
|---|---|---|
| VEHICLE INFORMATION TRANSFER PERIOD | SET INTERVAL OF TRANSFER TO SERVICE PROVIDING APPARATUS | 1,2,3,4,5,6,7,8,9,10. UNIT:sec |
| AVERAGE VEHICLE SPEED THRESHOLD VALUE | COMBINE TWO THRESHOLD VALUES, AND WHEN VEHICLE SPEED AVERAGE WITHIN TIME PERIOD SPECIFIED BY "DRIVING TIME THRESHOLD VALUE" IS "AVERAGE VEHICLE SPEED THRESHOLD VALUE" OR HIGHER, NOTIFY VEHICLE-MOUNTED TERMINAL OF SENSED FACT WHEN AVERAGE FALLS BELOW THRESHOLD VALUE AFTER ABNORMALITY SENSING, NOTIFY VEHICLE-MOUNTED TERMINAL OF SENSED FACT | 0,10,20,30,40,50,60,70,80,90,100, 110,120,130,140,150,160,170,180, 190,200 UNIT: km/h |
| DRIVING TIME THRESHOLD VALUE | | 1,30,40,50,60,70,80,90,100,110,120,UNIT: minutes |
| VEHICLE SPEED TRANSFER SETTING | SET WHETHER VEHICLE SPEED SHOULD BE TRANSFERRED TO SERVICE PROVIDING APPARATUS | ON, OFF. |
| ENGINE RPM TRANSFER SETTING | SET WHETHER ENGINE RPM SHOULD BE TRANSFERRED TO SERVICE PROVIDING APPARATUS | ON, OFF. |
| WATER TEMPERATURE TRANSFER SETTING | SET WHETHER WATER TEMPERATURE SHOULD BE TRANSFERRED TO SERVICE PROVIDING APPARATUS | ON, OFF. |
| CONSUMED FUEL TRANSFER SETTING | SET WHETHER CONSUMED FUEL SHOULD BE TRANSFERRED TO SERVICE PROVIDING APPARATUS | ON, OFF. |
| RUNNING DISTANCE TRANSFER SETTING | SET WHETHER RUNNING DISTANCE SHOULD BE TRANSFERRED TO SERVICE PROVIDING APPARATUS | ON, OFF. |
| SELECTION LEVER POSITION TRANSFER SETTING | SET WHETHER SELECTION LEVER POSITION SHOULD BE TRANSFERRED TO SERVICE PROVIDING APPARATUS | ON, OFF. |

[FIG5]

(SENSOR DEVICE CONFIGURATION SETTING INFORMATION)

| SETTING ITEM | SETTING DETAILS | SETTING VALUE |
|---|---|---|
| VITAL INFORMATION TRANSFER PERIOD | SET INTERVAL OF TRANSFER TO SERVICE PROVIDING APPARATUS | 1,2,3,4,5,6,7,8,9,10, UNIT:sec |
| HEART RATE TRANSFER THRESHOLD VALUE | TRANSFER DATA OF SPECIFIED THRESHOLD VALUE OR HIGHER TO SERVICE PROVIDING APPARATUS | 0,10,20,30,40,50,60,70,80,90,100, 110,120,130,140,150,160,170,180, 190,200 UNIT:beat per minutes |
| HEART RATE ABNORMALITY THRESHOLD VALUE | WHEN DATA OF SPECIFIED THRESHOLD VALUE OR HIGHER IS SENSED, NOTIFY VEHICLE-MOUNTED TERMINAL OF SENSED FACT WHEN DATA FALLS BELOW THRESHOLD VALUE AFTER ABNORMALITY SENSING, NOTIFY VEHICLE-MOUNTED TERMINAL OF SENSED FACT | 0,10,20,30,40,50,60,70,80,90,100, 110,120,130,140,150,160,170,180, 190,200 UNIT:beat per minutes |
| HEART RATE TRANSFER SETTING | SET WHETHER HEART RATE SHOULD BE TRANSFERRED TO SERVICE PROVIDING APPARATUS | ON, OFF. |
| PULSE INTERVAL TRANSFER SETTING | SET WHETHER PULSE INTERVAL SHOULD BE TRANSFERRED TO SERVICE PROVIDING APPARATUS | ON, OFF. |
| PULSE WAVE TRANSIT TIME TRANSFER SETTING | SET WHETHER PULSE WAVE TRANSIT TIME SHOULD BE TRANSFERRED TO SERVICE PROVIDING APPARATUS | ON, OFF. |
| AMPLITUDE VALUE TRANSFER SETTING | SET WHETHER AMPLITUDE VALUE (ECGWAVE) SHOULD BE TRANSFERRED TO SERVICE PROVIDING APPARATUS | ON, OFF. |
| AMPLITUDE VALUE TRANSFER SETTING | SET WHETHER AMPLITUDE VALUE (PULSEWAVE) SHOULD BE TRANSFERRED TO SERVICE PROVIDING APPARATUS | ON, OFF. |

[FIG6]

(LOG CONFIGURATION SETTING INFORMATION)

| SETTING ITEM | SETTING DETAILS | SETTING VALUE |
|---|---|---|
| LOG UPLOAD TIMING SETTING | SET TIMING OF UPLOADING SAVED LOG TO SERVICE PROVIDING APPARATUS | 1. AT START-UP: UPLOAD LOG TO SERVICE PROVIDING APPARATUS AFTER START-UP OF CGW 2. PERIODIC: UPLOAD LOG TO SERVICE PROVIDING APPARATUS SPECIFIED TIME PERIOD AFTER START-UP OF CGW SPECIFY 1, 15, 30, OR 60 MINUTES |

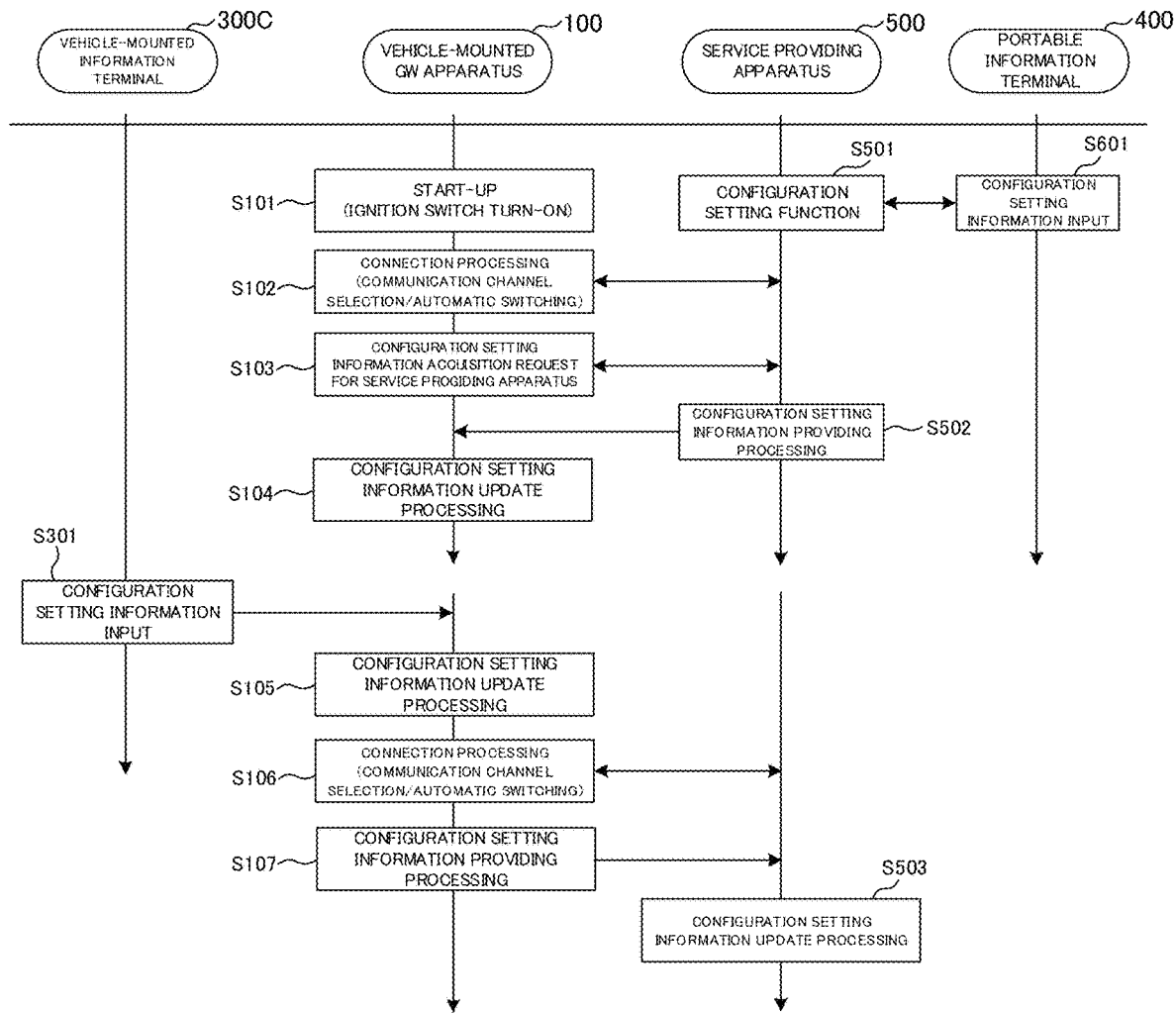

[FIG8]
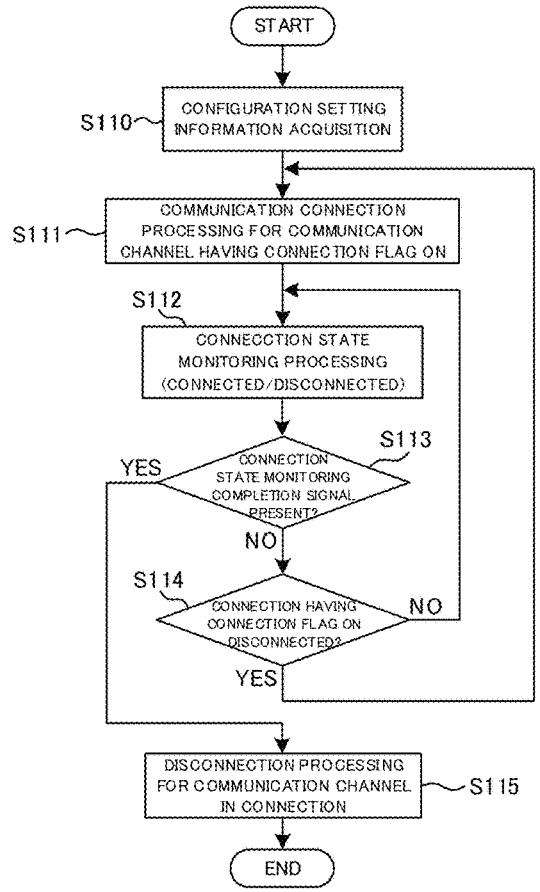
[FIG9]
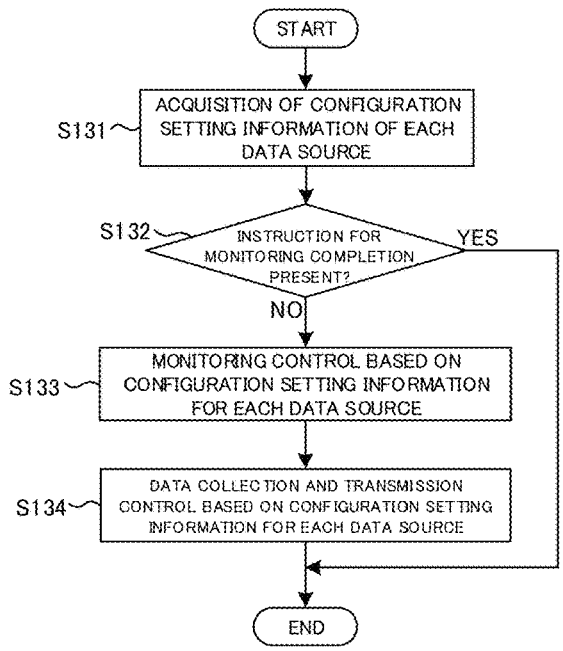

[FIG10]
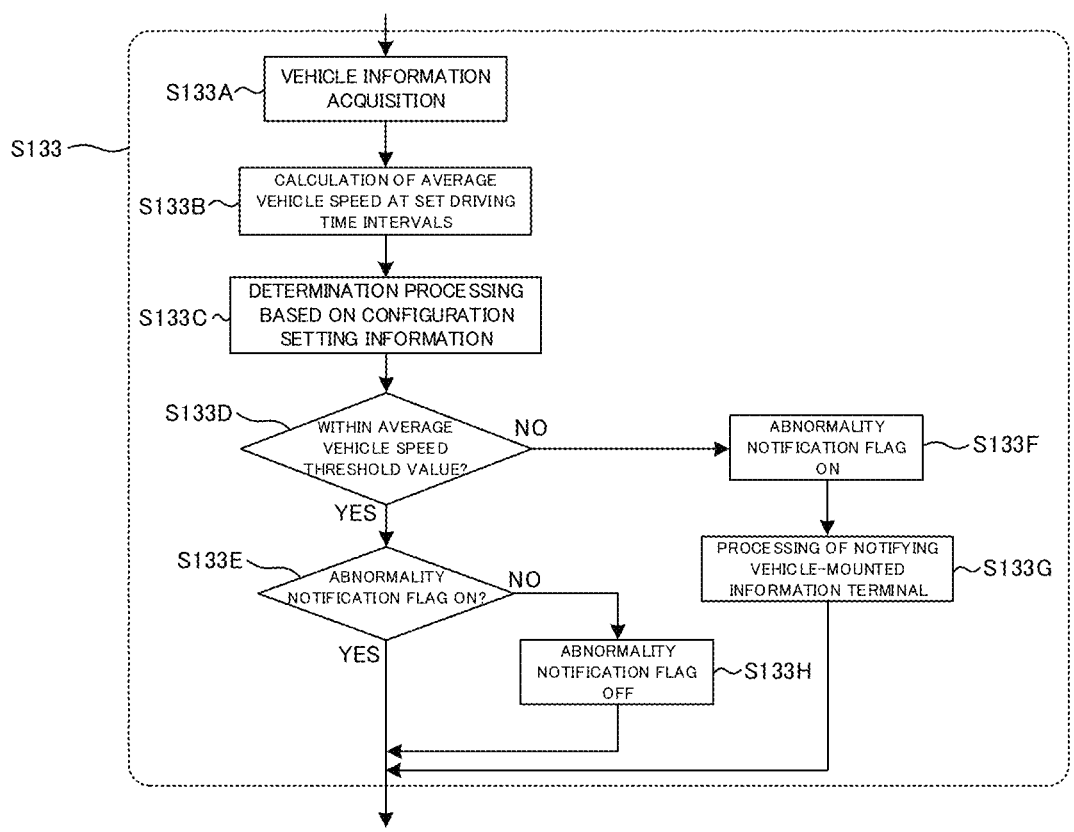

[FIG11]
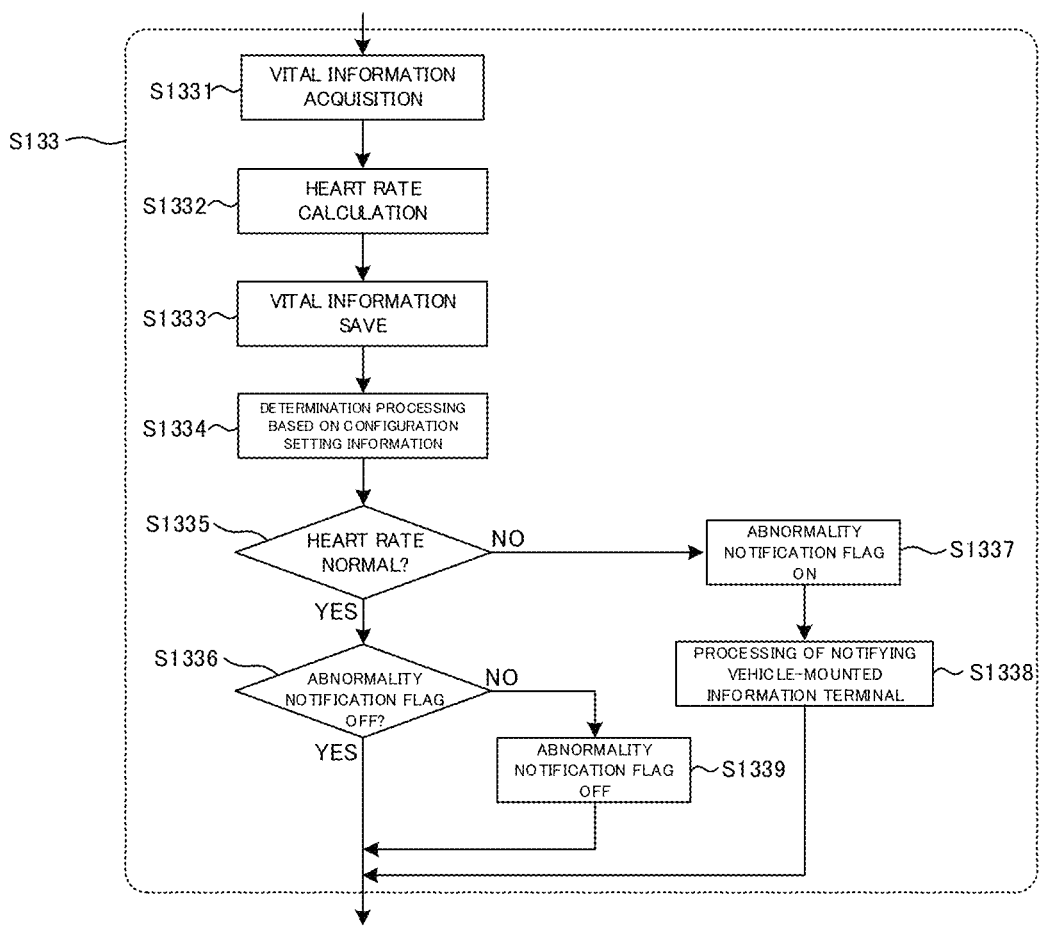

[FIG12]
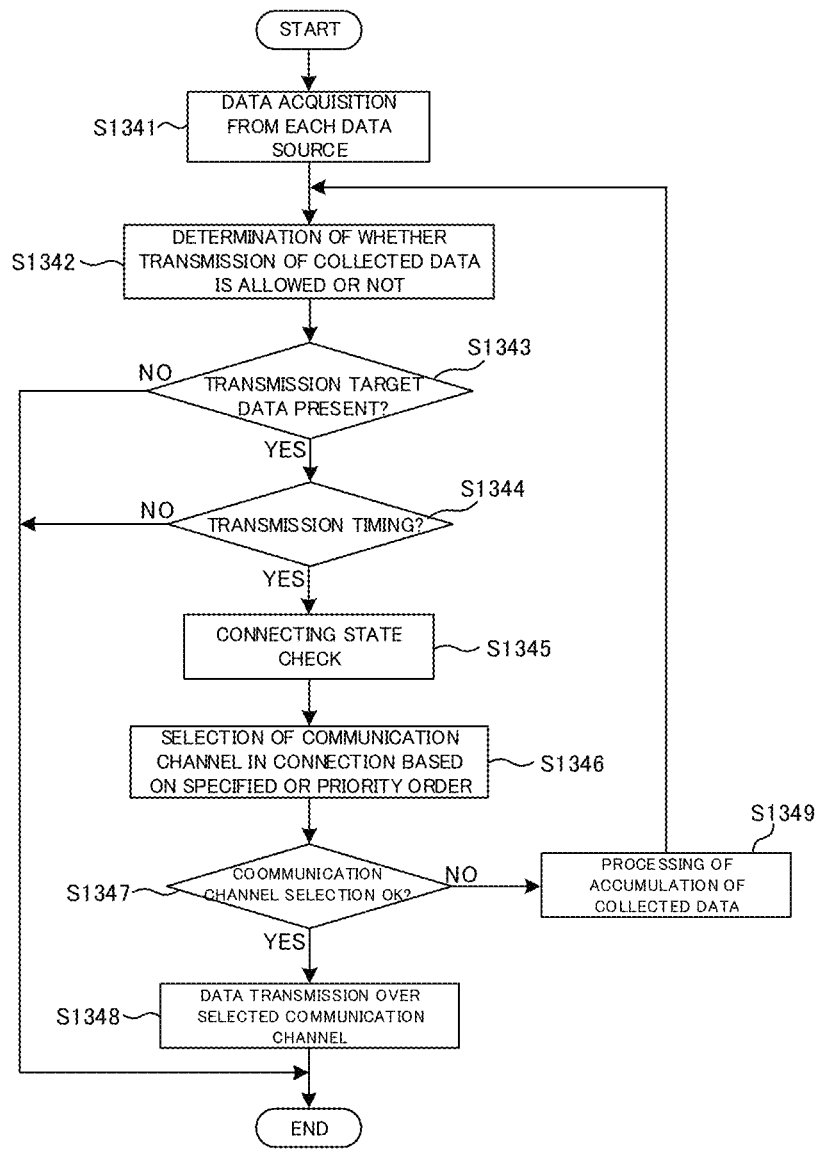

[FIG13]

(COMMUNICATION CONNECTION CONFIGURATION SETTING INFORMATION)

| SETTING ITEM | SETTING DETAILS | SETTING VALUE |
|---|---|---|
| SETTING OF COMMUNICATION SCHEME | COMMUNICATION CHANNEL PRIORITY SETTING FOR ENVIRONMENT SENSOR INFORMATION UPLOAD | WI-FI, PORTABLE INFORMATION TERMINAL, 3G/LTE, AUTOMATIC, NOT SET. DEGREES OF PRIORITY IN "AUTOMATIC" SETTING: WIFI > INFORMATION TERMINAL > 3G/LTE. |

[FIG14]

(ENVIRONMENT SENSOR CONFIGURATION SETTING INFORMATION)

| SETTING ITEM | SETTING DETAILS | SETTING VALUE |
|---|---|---|
| TEMPERATURE WARNING THRESHOLD VALUE | WHEN DATA OF SPECIFIED THRESHOLD VALUE OR HIGHER IS SENSED, NOTIFY VEHICLE-MOUNTED INFORMATION TERMINAL OF SENSED FACT. WHEN DATA FALLS BELOW THRESHOLD VALUE AFTER ABNORMALITY SENSING, NOTIFY VEHICLE-MOUNTED INFORMATION TERMINAL OF SENSED FACT | OFF, -30°C-100°C(10C° INCREMENTS) |
| HUMIDITY WARNING THRESHOLD VALUE | SAME AS ABOVE | OFF, 10-100%(10% INCREMENTS) |
| AIR-PRESSURE WARNING THRESHOLD VALUE | SAME AS ABOVE | OFF, 300-1,300hpa(100HPA INCREMENTS) |
| SHOCK WARNING THRESHOLD VALUE | SAME AS ABOVE | OFF, 1-15G(1G INCREMENTS) |
| ILLUMINANCE WARNING THRESHOLD VALUE | SAME AS ABOVE | OFF, 1, 10, 100, 1,000, 10,000lux |
| TEMPERATURE TRANSFER THRESHOLD VALUE | TRANSFER DATA OF SPECIFIED THRESHOLD VALUE OR HIGHER TO SERVICE PROVIDING APPARATUS | OFF, -30°C-100°C(10C° INCREMENTS) |
| HUMIDITY TRANSFER THRESHOLD VALUE | SAME AS ABOVE | OFF, 10-100%(10% INCREMENTS) |
| AIR-PRESSURE TRANSFER THRESHOLD VALUE | SAME AS ABOVE | OFF, 300-1,300hpa(100HPA INCREMENTS) |
| SHOCK TRANSFER THRESHOLD VALUE | SAME AS ABOVE | OFF, 1-15G(1G INCREMENTS) |
| ILLUMINANCE TRANSFER THRESHOLD VALUE | SAME AS ABOVE | OFF, 1, 10, 100, 1,000, 10,000lux |
| ENVIRONMENT SENSOR INFORMATION TRANSFER PERIOD | SET INTERVAL OF TRANSFER TO SERVICE PROVIDING APPARATUS | 1,2,3,4,5,6,7,8,9,10。 UNIT: sec。 |

[FIG15]

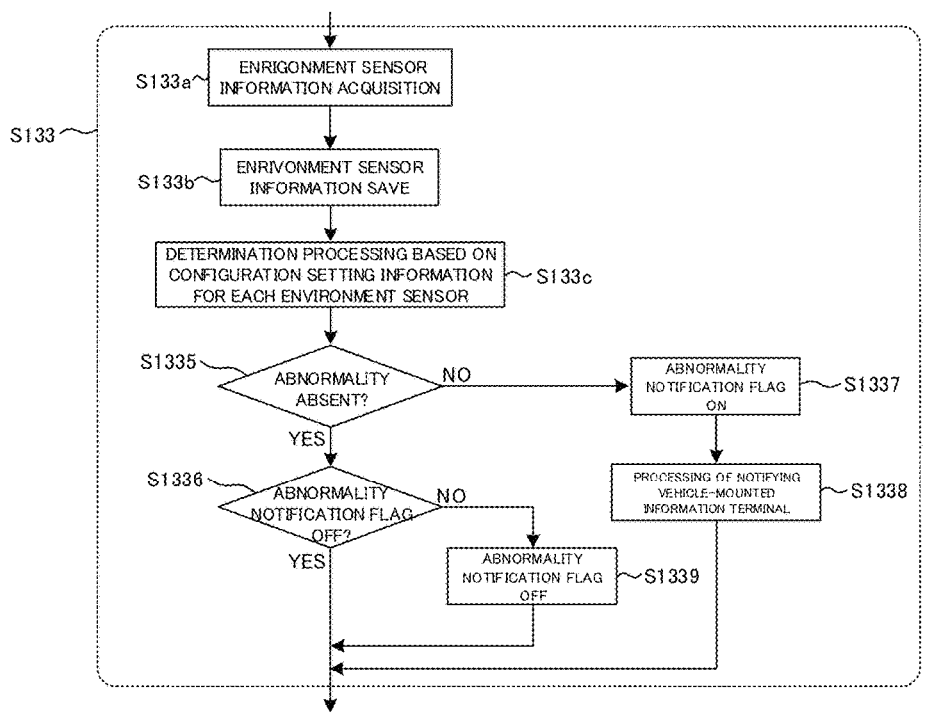

[FIG16]

(VEHICLE-MOUNTED CAMERA CONFIGURATION SETTING INFORMATION)

| SETTING ITEM | SETTING DETAILS | SETTING VALUE |
|---|---|---|
| MOBILE BODY SENSING WARNING THRESHOLD VALUE | WHEN DATA OF SPECIFIED THRESHOLD VALUE OR HIGHER IS SENSED, NOTIFY VEHICLE-MOUNTED INFORMATION TERMINAL OF SENSED FACT | Not Warning |
| | WHEN DATA FALLS BELOW THRESHOLD VALUE AFTER ABNORMALITY SENSING, NOTIFY VEHICLE-MOUNTED INFORMATION TERMINAL OF SENSED FACT | Caution |
| TRAFFIC CONE SENSING WARNING THRESHOLD VALUE | SAME AS ABOVE | Warning |
| | | OFF |
| | | Not Warning |
| | | Caution |
| | | Warning |
| | | OFF |
| HUMAN SENSING DISTANCE WARNING THRESHOLD VALUE | WHEN DATA OF SPECIFIED THRESHOLD VALUE OR LOWER IS SENSED, NOTIFY VEHICLE-MOUNTED INFORMATION TERMINAL OF SENSED FACT | OFF、0.5m-25.5m(0.5M INCREMENTS) |
| | WHEN DATA EXCEEDS ABOVE THRESHOLD VALUE AFTER ABNORMALITY SENSING, NOTIFY VEHICLE-MOUNTED INFORMATION TERMINAL OF SENSED FACT | |
| MOBILE BODY SENSING TRANSFER THRESHOLD VALUE | TRANSFER DATA OF SPECIFIED THRESHOLD VALUE OR HIGHER TO SERVICE PROVIDING APPARATUS | Not Warning |
| | | Caution |
| | | Warning |
| | | OFF |
| TRAFFIC CONE TRANSFER THRESHOLD VALUE | SAME AS ABOVE | Not Warning |
| | | Caution |
| | | Warning |
| | | OFF |
| HUMAN SENSING DISTANCE TRANSFER THRESHOLD VALUE | TRANSFER DATA OF SPECIFIED THRESHOLD VALUE OR LOWER TO SERVICE PROVIDING APPARATUS | OFF、0.5m-25.5m(0.5M INCREMENTS) |
| CAMERA DETECTION INFORMATION TRANSFER PERIOD | SET INTERVAL OF TRANSFER TO SERVICE PROVIDING APPARATUS | 1,2,3,4,5,6,7,8,9,10 。 |
| | | UNIT: sec. |

[FIG17]

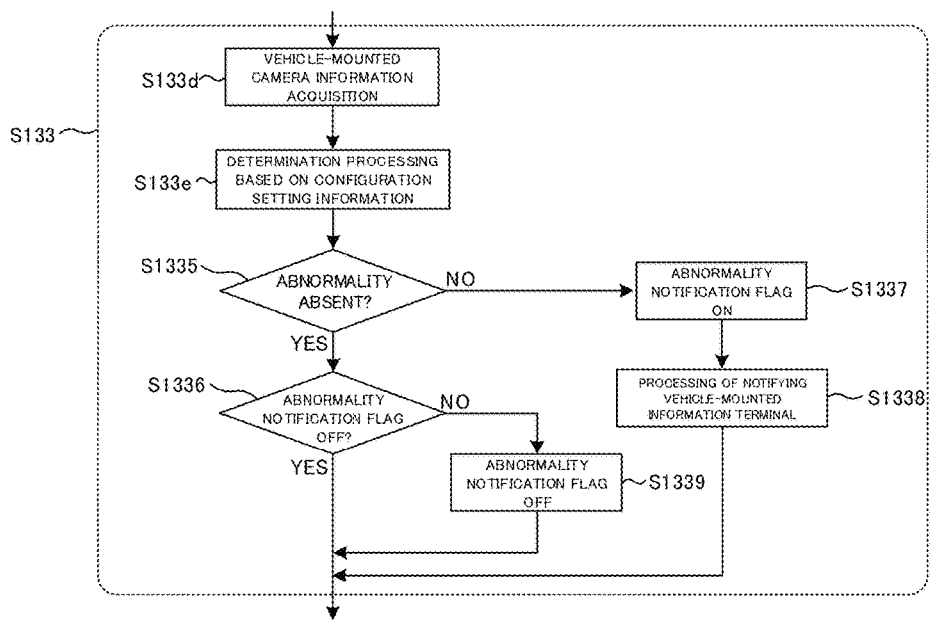

[FIG18]
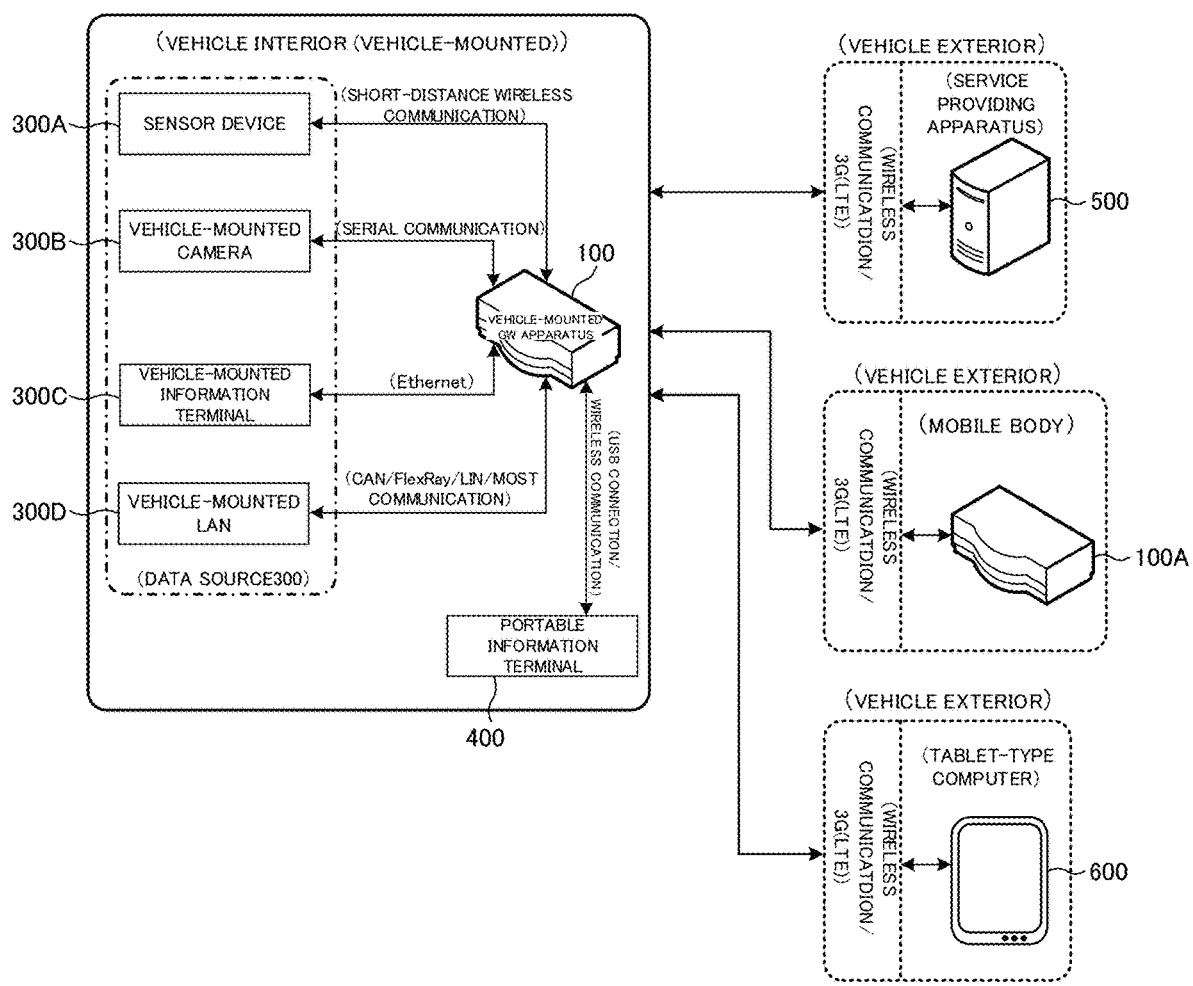

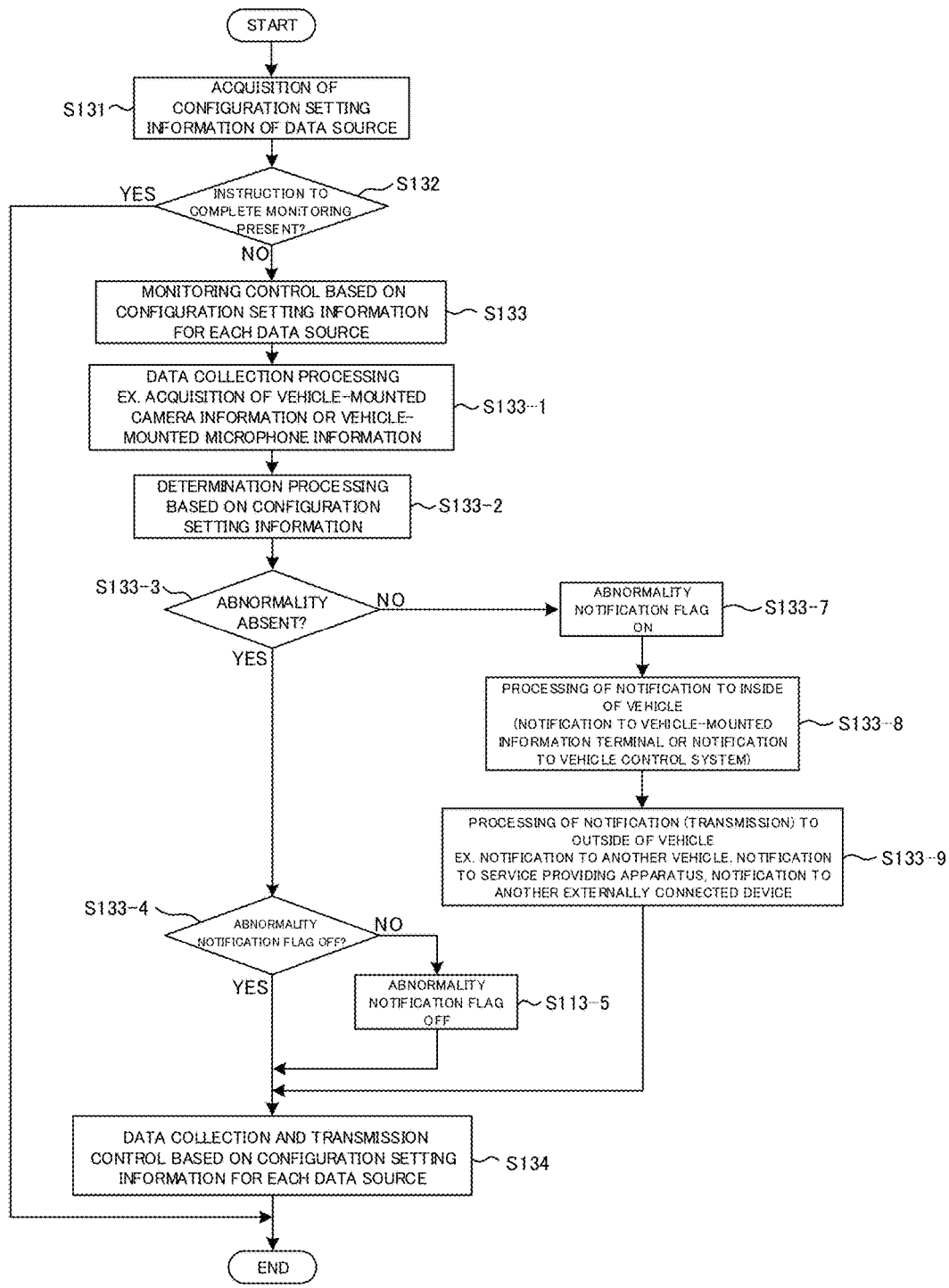
[FIG19]

VEHICLE-MOUNTED GATEWAY APPARATUS AND VEHICLE MOUNTED GATEWAY SYSTEM

TECHNICAL FIELD

An embodiment of the present invention relates to a vehicle-mounted gateway technique for connecting a data source inside a mobile body such as a vehicle to a network outside the mobile body.

BACKGROUND ART

Conventionally, vehicle-mounted devices having wireless communication functions have been mounted on or installed in mobile bodies such as a vehicle to allow connection to a computer system outside the vehicle.

PRIOR ART DOCUMENTS

Patent Documents

[Patent Document 1] Japanese Patent Laid-Open No. 2008-298490
[Patent Document 2] Japanese Patent Laid-Open No. 2012-249107

DISCLOSURE OF THE INVENTION

Problems to be Solved by the Invention

It is an object of the present invention to provide a vehicle-mounted gateway apparatus which stably connects a data source inside a mobile body such as a vehicle to a network outside the mobile body and which can select a communication channel appropriate for the data source inside the mobile body to allow connection to the network outside the mobile body.

Means for Solving the Problems

A vehicle-mounted gateway apparatus according to an embodiment is a vehicle-mounted gateway apparatus connected to a plurality of data sources within a mobile body and connectable to a network outside the mobile body. The vehicle-mounted gateway apparatus includes a communication device including an external communication interface for connection to the network outside the mobile body with each of a plurality of different external communication schemes and an internal communication interface for connection to each of the plurality of data sources; and a control device configured to transmit data collected from each of the data sources through the internal communication interface to the network outside the mobile body. The control device includes a communication control section configured to perform communication connection to the network outside the mobile body with each of the plurality of external communication schemes; a storage section storing Configuration information set for each of the data sources; a communication channel selection section configured to select a communication channel from the plurality of external communication schemes for each of the data sources; and a monitoring control section configured to monitor data output from each of the data sources and to transmit the data to the network outside the mobile body over a selected one of the communication channels associated with the data source. The Configuration information includes communication connection Configuration setting information including priority setting in which the plurality of external communication schemes are arranged in a predetermined priority order. The communication channel selection section is configured to switch between the communication channels associated with each of the data sources depending on a communication connection state of each of the plurality of external communication schemes based on the communication connection Configuration setting information.

BRIEF DESCRIPTION OF THE DRAWINGS

FIG. 1 A diagram showing the configuration of networks inside and outside a vehicle to which a vehicle-mounted gateway apparatus according to Embodiment 1 of the present invention is applied.
FIG. 2 A block diagram showing the components of the vehicle-mounted gateway apparatus according to Embodiment 1.
FIG. 3 A diagram showing an example of communication connection Configuration setting information according to Embodiment 1.
FIG. 4 A diagram showing an example of vehicle-mounted LAN Configuration setting information according to Embodiment 1.
FIG. 5 A diagram showing an example of sensor device Configuration setting information according to Embodiment 1.
FIG. 6 A diagram showing an example of log Configuration setting information according to Embodiment 1.
FIG. 7 A flow chart showing processing of updating and registering Configuration setting information according to Embodiment 1.
FIG. 8 A flow chart showing communication channel connection processing according to Embodiment 1.
FIG. 9 A flow chart showing monitoring control for each data source according to Embodiment 1.
FIG. 10 A flow chart showing a processing flow of monitoring control based on vehicle-mounted LAN Configuration setting information according to Embodiment 1.
FIG. 11 A flow chart showing a processing flow of monitoring control based on sensor device Configuration setting information according to Embodiment 1.
FIG. 12 A flow chart showing data collection and transmission control for each data source according to Embodiment 1.
FIG. 13 A diagram showing an example of communication connection Configuration setting information for an environment sensor according to Embodiment 1.
FIG. 14 A diagram showing an example of environment sensor Configuration setting information according to Embodiment 1.
FIG. 15 A flow chart showing a processing flow of monitoring control based on the environment sensor Configuration setting information according to Embodiment 1.
FIG. 16 A diagram showing an example of vehicle-mounted camera Configuration setting information according to Embodiment 1.
FIG. 17 A flow chart showing a processing flow of monitoring control based on the vehicle-mounted camera Configuration setting information according to Embodiment 1.
FIG. 18 A diagram showing the configuration of networks inside and outside a vehicle to which a vehicle-mounted gateway apparatus according to Embodiment 2 of the present invention is applied.
FIG. 19 A flow chart showing monitoring control for each data source according to Embodiment 2.

MODE FOR CARRYING OUT THE INVENTION

Embodiments of the present invention will be described in the following with reference to the accompanying drawings.

Embodiment 1

FIG. 1 is a diagram showing the configuration of networks inside and outside a vehicle to which a vehicle-mounted gateway apparatus 100 (hereinafter referred to as a vehicle-mounted GW apparatus) according to Embodiment 1 of the present invention is applied. The vehicle-mounted GW apparatus 100 is a vehicle-mounted device which is directly connected to a data source 300 inside the vehicle and/or connected to a vehicle-mounted network connected to the data source 300. While the present embodiment is described by using a vehicle as an example, the present invention is applicable to other mobile bodies (such as a train, a robot or an air vehicle remotely controlled through automatic or wireless operation).

The vehicle-mounted GW apparatus 100 is configured as a network node which can connect to a vehicle exterior network to provide relay between inside and outside the vehicle. The vehicle-mounted GW apparatus 100 includes communication interfaces for wireless communication compliant with wireless LAN standards such as Wi-Fi via access points or for mobile phone communication compliant with 3G or LTE (Long Term Evolution) via base stations. The vehicle-mounted GW apparatus 100 can connect to the vehicle exterior network through a plurality of communication channels (with external communication schemes).

The vehicle exterior network is an IP (Internet Protocol) network, for example. The vehicle-mounted GW apparatus 100 can connect to a service providing apparatus 500 over the IP network. The vehicle-mounted GW apparatus 100 can upload various types of data acquired from the data source 300 inside the vehicle to the service providing apparatus 500 and can receive various types of data from the service providing apparatus 500.

As shown in FIG. 1, the vehicle-mounted GW apparatus 100 can also connect to the vehicle exterior network via a portable information terminal 400 including a communication interface compliant with Wi-Fi or 3G/LTE. The vehicle-mounted GW apparatus 100 can connect to the portable information terminal 400 through USB (Universal Serial Bus) connection, wireless communication, and short-distance communication based on standards such as Bluetooth® and NFC (Near Field Communication). The portable information terminal 400 is a mobile device having communication functions such as a multifunctional mobile phone such as a smartphone, a mobile phone, or a tablet terminal. A user can also connect directly to the service providing apparatus 500 from the portable information terminal 400 or another computer apparatus having communication functions independently of the vehicle-mounted GW apparatus 100.

The vehicle-mounted GW apparatus 100 can connect to the data source 300 inside the vehicle directly or through an existing vehicle-mounted network. The data source 300 includes, for example, a sensor device 300A such as a microphone (sound collecting apparatus), a human sensor, or a vital sensor wearable by a user, a vehicle-mounted camera 300B such as a driving recorder equipped with a camera (imaging apparatus) or an in-car camera for imaging the interior of the vehicle, a vehicle-mounted information terminal 300C such as a navigation system including display means such as a liquid crystal display, and a vehicle-mounted LAN 300D. For the vehicle-mounted LAN 300D, a vehicle ECU for vehicle control or an audio device for multimedia serves as a data source.

The vehicle-mounted GW apparatus 100 performs data communication in accordance with a different communication scheme supported by each data source 300 or the associated vehicle-mounted network. For example, the sensor device 300A performs data communication through short-distance wireless communication. The vehicle-mounted camera 300B performs data communication through serial (UART) communication (RS232C, RS422, RS485) over cable connection to the vehicle-mounted GW apparatus 100. The vehicle-mounted information terminal 300C performs data communication through Ethernet communication over LAN cable connection.

The vehicle-mounted camera 300B can be equipped with an interface board including a UART circuit or an MIDI terminal, for example. In this case, the vehicle-mounted camera 300B can take video, and output and display the video to the vehicle-mounted information terminal 300C or another display through the MIDI terminal.

The vehicle-mounted LAN 300D comprises at least one vehicle-mounted network of a communication scheme such as CAN (Controller Area Network), FlexRay, LIN, or MOST (Media Oriented Systems Transport). The vehicle-mounted GW apparatus 100 connects to one or more of the vehicle-mounted networks constituting the vehicle-mounted LAN 300D to perform data communication according to the associated communication scheme.

FIG. 2 is a block diagram showing the components of the vehicle-mounted GW apparatus 100. The vehicle-mounted GW apparatus 100 includes, as its hardware configuration, a communication device 110 for providing a communication interface with each data source 300 (including the vehicle-mounted LAN 300D) or with the portable information terminal 400, and a control device 120 for performing overall control of the vehicle-mounted GW apparatus 100.

The communication device 110 includes a vehicle interior communication (internal communication) interface 111 for Ethernet, CAN, UART, USB, or short-distance wireless communication, and a vehicle exterior communication (external communication) interface 112 for wireless communication or mobile phone communication. As described above, the vehicle interior communication interface can be configured to include a function of wireless communication with the portable information terminal 400 for allowing connection to the vehicle exterior network via the portable information terminal 400.

The control device 120 is configured to include functional components operative principally by software. First of all, the control device 120 can control each of the data sources 300. For example, the control device 120 can perform sensor control of the sensor device 300A (including operation or data detection), imaging control of the vehicle-mounted camera (including video output control), and terminal control of the vehicle-mounted information terminal 300C.

Thus, the control device 120 can output data received from the vehicle exterior network to the data source 300 or can control the data source 300 based on the received data. The control device 120 can also control one or both of two data sources 300 in operation performed between those data sources 300. For example, the control device 120 can perform control to display detected data acquired by the sensor device 300A or video taken by the vehicle-mounted camera 300B on the display of the vehicle-mounted information terminal 300C.

The control device 120 according to Embodiment 1 includes a vehicle interior communication control section 121, a vehicle exterior communication control section 122, and a gateway control section (GW control section) 123.

The vehicle-mounted GW apparatus 100 has a device driver installed therein for each of wireless communication, mobile phone communication, UART, USB, short-distance wireless communication and the like. The vehicle interior communication control section 121 and the vehicle exterior communication control section 122 control communication through the vehicle interior communication interface 111 and the vehicle exterior communication interface 112 using each device driver. The vehicle interior communication control section 121 can also control communication with the vehicle-mounted LAN 300D, for example, without interposing any device driver.

The vehicle exterior communication control section 122 can perform registration of access points for wireless communication via Wi-Fi and the like. For example, the vehicle exterior communication control section 122 can detect and register access points at different locations as the vehicle physically moves.

The GW control section 123 is configured to include a network control section 123A, a communication control section 123B, and a storage section 123C. The network control section 123A includes a routing control section 1231, a protocol conversion section 1232, and a security section 1233. The routing control section 1231 performs routing control in transmitting data collected from each data source 300 (including the vehicle-mounted LAN 300D) to the vehicle exterior network and routing control in transmitting data received from the vehicle exterior network to each data source 300. The routing control section 1231 also performs routing control in data communication between the data sources 300 within the vehicle interior network.

The protocol conversion section 1232 performs protocol conversion between different communication schemes associated with the data sources. The different communication schemes for the respective data sources 300 can be previously held in the form of a protocol conversion table. The protocol conversion section 1232 performs protocol conversion, for example in transmitting data received from the vehicle exterior network to the data source 300.

The security section 1232 performs communication setting and communication processing for SSL (Secure Sockets Layer)/TLS (Transport Layer Security) protocol. SSL/TLS communication can be set for each data source 300. The security section 1232 can check whether the SSL/TSL should be set and can perform encryption in transmitting data from the vehicle interior network to the vehicle exterior network.

The storage section 123C stores various types of data to be processed in the control device 120, information for use in each processing, data or information received from the vehicle exterior network, and the like. While the storage section 123C is contained in the vehicle-mounted GW apparatus 100 in the example of FIG. 2, the storage section 123C may be externally attached to the vehicle-mounted GW apparatus 100, for example. In this case, the vehicle-mounted GW apparatus 100 can include a connection port (such as a USB port) for connection to the external storage section 123C.

The communication control section 123B includes a communication state monitoring section 1234, a communication channel selection section 1235, a monitoring control section 1236, and a Configuration setting control section 1237. The communication control section 123B performs communication channel selection control, data monitoring control, and data transmission control for transmitting data collected from the data source 300 to the vehicle exterior network based on Configuration setting information.

FIG. 3 to FIG. 6 are diagrams showing examples of the Configuration setting information for use in Embodiment 1.

FIG. 3 is a diagram showing an example of communication connection Configuration setting information for use in the communication channel selection control performed by the communication channel selection section 1235. Communication connection Configuration setting includes communication channel setting in data transmission from the vehicle interior network to the vehicle exterior network and communication channel setting in data reception from the vehicle exterior network to the vehicle interior network.

The vehicle-mounted GW apparatus 100 according to Embodiment 1 is mounted in a mobile body such as a vehicle. Thus, for example, the vehicle-mounted GW apparatus 100 is assigned a dynamic IP address to serve as a network node. In data transmission and reception, the vehicle-mounted GW apparatus 100 actively accesses the service providing apparatus 500 over the vehicle exterior network to establish connection.

Communication connection in data reception from the vehicle exterior network is established mainly over a communication channel for Configuration setting and a communication channel for large-scale data delivery. As described later, the Configuration setting information can be received from the service providing apparatus 500. The large-scale data delivery provides, for example, map data for use by the vehicle-mounted information terminal 300C.

The setting details for the communication connection include automatic setting and/or priority setting. The vehicle-mounted GW apparatus 100 can connect to the vehicle exterior network over channels associated with a plurality of communication schemes. For example, the vehicle-mounted GW apparatus 100 can select one of three channels associated with Wi-Fi, portable information terminal, and 3G/LTE, or can set the degrees of priority for the three channels. For "automatic setting," the degrees of priority can be preset as desired. For example, Wi-Fi has the highest priority, portable information terminal is the next, and then 3G/LTE.

Communication connection in data transmission from the vehicle interior network to the vehicle exterior network is established, for example, over a communication channel for vital information upload, a communication channel for vehicle information upload, and a communication channel for log information upload. The communication connection can also be established over a communication channel for uploading video or image taken by the vehicle-mounted camera 300B. For those communication channels, automatic setting and/or priority setting can be performed similarly.

The communication connection Configuration setting also includes valid/invalid setting of each of the plurality of communication channels used by the vehicle-mounted GW apparatus 100. Valid (ON)/invalid (OFF) can be set for Wi-Fi communication usage, 3G/LTE communication usage, and portable information terminal communication usage. In selecting the communication channels according to the set order of priority, control can be performed such that the valid/invalid in the setting of communication usage can be given a higher priority to avoid selection of any communication channel set "invalid."

The communication connection Configuration setting also includes specification (registration) of the URL of the service providing apparatus 500 which serves as the connection point (destination) of the vehicle exterior network. For connecting to a plurality of service providing apparatuses 500, a plurality of URLs are specified in the vehicle-mounted GW apparatus 100. It should be noted that each data node 300 may be connected to a different service providing apparatus 500. Specifically, the data sources can be associated with different service providing apparatuses 500 for connection such that data acquired from a particular data source is transmitted to the associated service providing apparatus 500.

FIG. 4 is a diagram showing an example of vehicle-mounted LAN Configuration setting information. The vehicle-mounted LAN Configuration setting information is used for monitoring control performed by the monitoring control section 1236. The vehicle-mounted LAN 300D can output vehicle information monitored by the vehicle ECU to the vehicle-mounted GW apparatus 100, for example.

The vehicle-mounted LAN Configuration setting information includes setting information related to vehicle information transfer (upload) period, average vehicle speed threshold value, driving time threshold value and the like. The vehicle-mounted LAN Configuration setting information also includes ON/OFF setting information for selecting vehicle information to be transmitted to the service providing apparatus 500. For example, ON/OFF setting can be performed for transmission of vehicle information related to vehicle speed, engine rpm, water temperature, consumed fuel, running distance, and selection lever position.

FIG. 5 is a diagram showing an example of sensor device Configuration setting information. The sensor device Configuration setting information is used for monitoring control performed by the monitoring control section 1236. For example, the sensor device 300A can measure and/or calculate the heart rate, pulse interval, and blood pressure of a user and output them to the vehicle-mounted GW apparatus 100.

The sensor device Configuration setting information includes setting information related to vital information transfer (upload) period, hart rate transfer threshold value, and heart rate abnormality threshold value. The sensor device Configuration setting information also includes ON/OFF setting information for selecting vital information to be transmitted to the service providing apparatus 500. For example, ON/OFF setting can be performed for transmission of vital information related to heart rate, pulse interval, pulse wave transit time, and amplitude value.

FIG. 6 is a diagram showing an example of log Configuration setting information. GW control section 123 can collect logs indicating normal/abnormal conditions of processing throughout the control device 120. Each section included in the GW control section 123 creates a log for each processing and stores them in a storage area. The log Configuration setting information sets a timing at which the accumulated log information should be transmitted as data to the service providing apparatus 500.

The Configuration setting control section 1237 sets (updates) the Configuration setting information input to the control device 120 in a predetermined storage area such that the Configuration setting information is available to the communication channel selection section 1235 and the monitoring control section 1236.

The Configuration setting information can be set via the vehicle-mounted information terminal 300C. For example, the Configuration setting control section 1237 can display a Configuration setting input screen on the display of the vehicle-mounted information terminal 300C and store the Configuration setting information input to the input screen by the user. When the Configuration setting information is input and set on the vehicle-mounted information terminal 300C, the Configuration setting control section 1237 uploads the set (uploaded) Configuration setting information to the service providing apparatus 500 over a predetermined communication channel at a predetermined timing.

The Configuration setting information can also be set in the service providing apparatus 500. For example, the user can connect to the service providing apparatus 500 from the portable information terminal 400 and the service providing apparatus 500 can provide a Configuration setting function similar to that of the Configuration setting control section 1237. The service providing apparatus 500 can display a Configuration setting input screen on a display of the portable information terminal 400 and store the Configuration setting information input to the input screen by the user in a storage area within the service providing apparatus 500. Then, the service providing apparatus 500 transmits the set Configuration setting information in response to a Configuration acquisition request from the vehicle-mounted GW apparatus 100. The Configuration setting control section 1237 updates the Configuration setting information received from the service providing apparatus 500.

FIG. 7 is a flow chart showing processing of updating and registering Configuration setting information. The user can connect to the service providing apparatus 500 from the portable information terminal 400 and use the configuration setting function provided by the service providing apparatus 500 to register (update) the configuration setting information for each user (S501, S601). In other words, the user can update and register the configuration setting information on the side of the vehicle exterior network.

The vehicle-mounted GW apparatus 100 can start up, for example by receiving power supply from a battery of the vehicle in response to turn-on/turn-off of an ignition switch of the vehicle (S101). The vehicle-mounted GW apparatus 100 can connect to the service providing apparatus 500 upon start-up to acquire the configuration setting information directly updated and registered in the service providing apparatus 500. For this processing, the vehicle-mounted GW apparatus 100 performs communication channel selection processing based on the communication connection Configuration setting information shown in FIG. 3 (S102).

The vehicle-mounted GW apparatus 100 (Configuration setting control section 1237) transmits a Configuration setting information acquisition request to the service providing apparatus 500 over a selected communication channel (S103). The service providing apparatus 500 transmits the Configuration setting information in response to the request (S502). The vehicle-mounted GW apparatus 100 updates the received Configuration setting information (S104).

As described above, the vehicle-mounted information terminal 300C can provide the Configuration setting function. The vehicle-mounted information terminal 300C outputs Configuration setting information input by the user to the vehicle-mounted GW apparatus 100 (S301). The vehicle-mounted GW apparatus 100 updates the input Configuration setting information (S105). When the Configuration setting information is updated and registered on the vehicle-mounted information terminal 300C, that is, the side of the vehicle interior network, the vehicle-mounted GW apparatus 100 performs the communication channel selection processing based on the communication connection Configuration setting information (8106), and uploads the Configuration setting information to the service providing apparatus 500 at a predetermined timing (S107). The service providing apparatus 500 updates and registers the Configuration setting information uploaded by the vehicle-mounted GW apparatus 100 for each user (S503).

The data communication between the vehicle-mounted GW apparatus 100 and the service providing apparatus 500 can be validated by both of them using a preset identification ID of the user and a individual identifier (for example, a MAC address) of the vehicle GW apparatus 100. The vehicle-mounted GW apparatus 100 performs control such that the individual identifier is included in the data uploaded in the data communication with the service providing apparatus 500.

FIG. 8 is a flow chart showing communication channel connection processing. After start-up, the vehicle-mounted GW apparatus 100 (communication control section 123B) acquires the communication connection Configuration setting information shown in FIG. 3 (S110). The vehicle-mounted GW apparatus 100 performs communication connection processing on a communication channel having its connection flag ON (S111). The connection flag indicates valid (ON)/invalid (OFF) in communication usage setting of each communication scheme.

In Embodiment 1, when a plurality of communication channels have their connection flags ON, control is performed such that all the plurality of communication channels maintain their communication connections. Specifically, all the plurality of communication channels having their connection flags ON are controlled to maintain the connecting states continuously regardless of monitoring control or data collection and transmission control in the vehicle-mounted GW apparatus 100. For each data source 300, an appropriate communication channel is selected based on the Configuration setting depending on the communication state of each communication channel, and data communication with the vehicle exterior network is performed.

The communication state monitoring section 1234 monitors the communication state (connected/disconnected) of each communication channel having its connection flag ON (S112). The communication state monitoring section 1234 outputs the communication state of each communication channel to the communication control section 123B. Then, the communication state monitoring section 1234 checks the presence or absence of a connection state monitoring completion signal (for example, an OFF signal of the ignition switch of the vehicle) (S113). When the monitoring should not be completed, the control proceeds to step S114. When it is determined that the communication channel having its connection flag ON is not disconnected (NO at S114), the communication control section 123B continues the monitoring of the communication state. Alternatively, when it is determined that the communication channel is disconnected (YES at S114), the control returns to step S111, and the communication control section 123B again performs the communication connection processing on the disconnected communication channel having its connection flag ON. When the connection state monitoring completion signal is input at step S113 and thus the monitoring should be completed, the control proceeds to step S115 to perform disconnection processing on any communication channel in connection.

FIG. 9 is a flow chart showing monitoring control for each data source.

The communication control section 123B acquires the Configuration setting information of each data source 300 (S131). Similarly to the communication state monitoring, the communication control section 123B checks the presence or absence of a signal for completing monitoring control of each data source such as an OFF signal of the ignition switch of the vehicle (S132). When it is determined that monitoring control should be performed (NO at S132), the monitoring control is performed based on the Configuration setting information set for each data source 300.

The data source 300 can output continuous data in time series to the vehicle-mounted GW apparatus 100. The monitoring control based on the Configuration setting information includes abnormality detection control (S133) in which data collected from the data source 300 is monitored, and occurrence of abnormality is sensed, for example when data exceeding a threshold value is detected, and data collection and transmission control (S134) in which the data collected from the data source 300 is transmitted to the vehicle exterior network.

The monitoring control section 1236 can perform, for each data source, abnormality detection of the data output from the data source 300. When abnormality is detected, the monitoring control section 1236 can perform notification processing of displaying the fact that the abnormality is detected on the vehicle-mounted information terminal 300C, for example.

FIG. 10 and FIG. 11 are diagrams showing examples of abnormality monitoring control. FIG. 10 is a flow chart showing a processing flow of abnormality monitoring control based on the vehicle-mounted LAN Configuration setting information.

As shown in FIG. 10, the monitoring control section 1236 acquires vehicle information from the vehicle-mounted LAN 300D (such as the vehicle ECU) (S133A). The monitoring control section 1236 calculates an average vehicle speed at set driving time intervals (S133B). The monitoring control section 1236 performs determination processing of determining whether the calculated average vehicle speed exceeds the average vehicle speed threshold value set in the vehicle-mounted LAN Configuration setting information (S133C). The result of the determination processing shows that the calculated average vehicle speed does not exceed the average vehicle speed threshold value (YES at S133D), the monitoring control section 1236 checks whether an abnormality notification flag is OFF (S133E). When the abnormality notification flag is ON (NO at S133E), the monitoring control section 1236 updates the abnormality notification flag to OFF (S133H).

Alternatively, when the result of the determination processing at step S133D shows that the calculated average vehicle speed exceeds the average vehicle speed threshold value (NO at S133D), the monitoring control section 1236 updates the abnormality notification flag to ON (S133F). The monitoring control section 1236 performs processing of notifying the vehicle-mounted information terminal 300C based on the abnormality notification flag being ON (S133G).

FIG. 11 is a flow chart showing a processing flow of monitoring control based on sensor device Configuration setting information. As shown in FIG. 11, the monitoring control section 1236 acquires vital information from the sensor device 300A (a vital sensor such as a heart rate meter or a pulsimeter) (S1331). The monitoring control section 1236 calculates the heart rate from the acquired vital information (S1332) and saves the calculated heart rate (S1333). The monitoring control section 1236 performs determination processing of determining whether the calculated heart rate exceeds the heart rate abnormality threshold value set in the sensor device Configuration setting information (S1334). The result of the determination processing shows that the calculated heart rate does not exceed the heart rate abnormality threshold value (YES at S1335), the monitoring control section 1236 checks whether the abnormality notification flag is OFF (S1336). When the abnormality notification flag is ON (NO at step S1336), the monitoring control section 1236 updates the abnormality notification flag to OFF (S1339).

Alternatively, when the result of the determination processing at step S1335 shows that the calculated heart rate exceeds the heart rate abnormality threshold value (NO at step S1335), the monitoring control section 1236 updates the abnormality notification flag to ON (S1337). The monitoring control section 1236 performs processing of notifying the vehicle-mounted information terminal 300C based on the abnormality notification flag being ON (S1338).

FIG. 12 is a flow chart showing data collection and transmission control in the monitoring control section 1236. The data collection and transmission control includes processing such as data transmission control, communication channel selection, and data holding upon disconnection of communication.

The data transmission control involves filtering control for data to be transmitted to the vehicle exterior network and data transmission timing control based on the Configuration setting information. The monitoring control section 1236 acquires data from each data source 300 (S1341) and performs processing of determining whether transmission of the collected data is allowed or not based on the Configuration setting information (S1342).

For example, the monitoring control section 1236 can set a threshold value and transmit only the data exceeding the threshold value. The monitoring control section 1236 determines whether the collected data is transmission target data based on the Configuration setting information (S1343), and when the collected data is transmission target data, the monitoring control section 1236 performs control to transmit that data to the vehicle exterior network (YES at S1343). Alternatively, when the collected data is not transmission target data, the monitoring control section 1236 performs control not to transmit that data to the vehicle exterior network (NO at S1343).

In the data transmission control, the timing of the data transmission can also be controlled. For example, when the data source 300 outputs data at short time intervals, the amount of communication is increased if all the data is transmitted to the vehicle exterior network. To address this, a data transfer interval longer than the time interval of data output from the data source is set based on the Configuration setting information. The monitoring control section 1236 determines the transmission timing of the data determined as transmission target data at step S1343 based on the Configuration setting information (S1344). The monitoring control section 1236 controls the transmission target data to be transmitted to the vehicle exterior network if the present moment matches the set transmission timing (transmit period) (YES at S1344), or controls the transmission target data not to be transmitted to the vehicle exterior network if the present moment does not match the transmission timing (NO at S1344).

As described above, only the data at the predetermined timing can be selected for transmission from the data continuously output in time series from the data source 300 to reduce the amount of transmission. It should be noted that the filtering control and the data transmission timing control can be performed such that any data having abnormality detected in the abnormality detection control is transmitted to the vehicle exterior network without fail. While the filtering control and the data transmission timing control are associated with each other as described above, only one of them may be applied instead.

The communication channel selection section 1235 performs processing of selecting the communication channel to the vehicle exterior network in the data collection and transmission control performed by the monitoring control section 1236. Specifically, the communication channel selection section 1235 checks the communication state based on the monitoring of the communication channel performed by the communication state monitoring section 1234 (S1345), and selects the communication channel in connection based on the specified order or priority order in the communication connection Configuration setting information for each data source 300 of data to be transmitted (S1346).

When the communication channel is selected by the communication channel selection section 1235 (YES at S1347), the monitoring control section 1236 transmits the collected data to the vehicle exterior network (service providing apparatus 500) through the vehicle exterior communication control section 122 based on the Configuration setting information (S1348). The data transmitted to the vehicle exterior network may be removed from the vehicle-mounted GW apparatus 100 as appropriate.

When all the communication channels set in the communication connection Configuration setting information are in disconnected states, the communication channel selection section 1235 cannot select any communication channel in connection. Then, when the communication channel cannot be selected based on the specified order or priority order (NO at S1347), the monitoring control section 1236 determines that data transmission to the vehicle exterior network cannot be performed and then performs data holding processing during disconnection of communication (S1349).

The data holding processing during disconnection of communication is processing of temporarily accumulating in time series the data collected by the monitoring control section 1236 until any of the communication channels is available. In the data transmission processing at step S1348, the monitoring control section 1236 can transmit the data temporarily held due to the inability to transmit at the previous data transmission timing together with the presently collected data to the vehicle exterior network.

For example, when Wi-Fi is not available but 3G/LTE is available at the data transmission timing, the monitoring control section 1236 can temporarily save the data without performing data transmission, and then can perform collective data transmission to the vehicle exterior network once Wi-Fi is available. In this case, for example in transmitting video taken by the vehicle-mounted camera 300B to the vehicle exterior network, the data capacity is large and thus the video data can be temporality saved until the condition suitable for Wi-Fi is established, and once Wi-Fi is available, the data can be transmitted collectively.

Thus, for example based on the data capacity or the data priority in transmission to the vehicle exterior network, video data from the vehicle-mounted camera 300B can be set for transmission over a communication channel only via Wi-Fi, vehicle information from the vehicle-mounted LAN 300D can be set for transmission over a communication channel via Wi-Fi or 3G/LTE, and abnormality information detected in the abnormality monitoring control can be set for transmission over all the communication channels (via Wi-Fi, 3G/LTE, or portable information terminal).

The abnormality monitoring control and the data collection and transmission control of Embodiment 1 are performed independently of each other. Specifically, even when various types of data collected from the data source 300 cannot be transmitted to the vehicle exterior network due to disconnection of communication, an abnormality status detected in the abnormality monitoring control can be notified to the user via the vehicle-mounted information terminal 300C. As a result, the abnormality status can be notified to the user regardless of the state of communication with the vehicle exterior network.

Next, an example of service in the service providing apparatus 500 is described. For example, the service providing apparatus 500 can provide vehicle information or vital information received from the vehicle-mounted GW apparatus 100 as vehicle driving information or user healthcare information. For example, when the user connects to the service providing apparatus 500 from the portable information terminal 400, the user can view each monitoring result (monitoring screen) based on the vehicle information or vital information received from the vehicle-mounted GW apparatus 100.

The service providing apparatus 500 can also provide the vehicle-mounted GW apparatus 100 with information related to the monitoring result of the vehicle information or vital information received from the vehicle-mounted GW apparatus 100. For example, the service providing apparatus 500 can perform abnormality detection by setting a threshold value different from that in the abnormality detection control performed by the monitoring control section 1236 or perform composite abnormality detection from a plurality of vehicle information items (including engine rpm, water temperature, consumed fuel, running distance, and selection lever position) received other than the average vehicle speed, and can feed back the detection result to the vehicle-mounted GW apparatus 100. It should be noted that the abnormality detection control in the vehicle-mounted GW apparatus 100 is performed independently of the abnormality detection control in the service providing apparatus 500 since the abnormality detection control in the service providing apparatus 500 cannot acquire the vehicle information or vital information from the vehicle-mounted GW apparatus 100 while the communication is disconnected. The abnormality detection control in the monitoring control section 1236 is performed continuously even while the communication is disconnected.

Another service example is voice recognition processing. The vehicle-mounted GW apparatus 100 can acquire voice information of the user from a sound collecting microphone serving as the data source. The vehicle-mounted GW apparatus 100 transmits the voice information to the service providing apparatus 500. The service providing apparatus 500 has a voice recognition function to allow conversion of the received voice information into text. By utilizing the voice recognition function, the service providing apparatus 500 can recognize, for example, that the user utters "it's hot," and produce an air-conditioner control signal for lowering the temperature set in an air conditioner by a predetermined degrees and transmit the signal to the vehicle-mounted GW apparatus 100. The vehicle-mounted GW apparatus 100 can transmit the received air-conditioner control signal to the vehicle-mounted LAN 300D to allow the vehicle ECU to perform control of reducing the temperature set in the air conditioner.

FIG. 13 to FIG. 17 are diagrams for explaining another aspect of Embodiment 1. FIG. 13 is a diagram showing an example of communication connection Configuration setting information for an environment sensor. The environment sensor corresponds to the sensor device 300A described above. The environment sensor includes a temperature sensor, a humidity sensor, an air-pressure sensor, a shock (acceleration) sensor, and an illuminance sensor. For setting details and setting values, communication channels in data transmission from the vehicle interior network to the vehicle exterior network are set similarly to the example of FIG. 3. In the example of FIG. 13, the sensors are regarded as the single environment sensor, and the common communication connection Configuration setting information is defined. However, the information may be defined for each sensor.

FIG. 14 is a diagram showing an example of environment sensor Configuration setting information. The environment sensor Configuration setting information shown in FIG. 14 can be applied to perform the monitoring control (including the abnormality detection control and data collection and transmission control) described in FIG. 9 to FIG. 11 in which each environment sensor such as the temperature sensor, humidity sensor, air-pressure sensor, shock (acceleration) sensor, or illuminance sensor is used as the data source. In the example of FIG. 14, the sensors are regarded as the single environment sensor, and the common transfer period is defined. However, the transfer period may be defined for each sensor.

FIG. 15 is a flow chart showing a processing flow of abnormality monitoring control based on the environment sensor Configuration setting information.

As shown in FIG. 15, the monitoring control section 1236 acquires sensor information from each environment sensor (S133a). The monitoring control section 1236 saves the acquired sensor information (S133b) and performs determination processing of determining whether the sensor information exceeds a threshold value for each sensor set in the environment sensor Configuration setting information (S133c). The result of the determination processing shows that the collected sensor information does not exceed the threshold value (YES at S1335), the monitoring control section 1236 checks whether the abnormality notification flag is OFF (S1336). When the abnormality notification flag is ON (NO at S1336), the monitoring control section 1236 updates the abnormality notification flag to OFF (S1339). Alternatively, when the result of the determination processing at step S1335 shows that the sensor information exceeds the threshold value (NO at S1335), the monitoring control section 1236 updates the abnormality notification flag to ON (S1337). The monitoring control section 1236 performs processing of notifying the vehicle-mounted information terminal 300C based on the abnormality notification flag being ON (S1338).

FIG. 16 shows a diagram showing an example of vehicle-mounted camera Configuration setting information. The vehicle-mounted camera 300B can be configured to include a single or a plurality of cameras such as a vehicle interior imaging camera or vehicle exterior imaging camera, for example.

For example, a moving object outside the vehicle (such as a moving object rushing into an imaging range) can be detected from imaging information acquired by the vehicle exterior imaging camera. As another example, a traffic cone (color Cone®) placed on a road can be detected from imaging information acquired by the vehicle exterior imaging camera, or a human near the vehicle and the distance to the human can be detected from imaging information acquired by the vehicle exterior imaging camera. The vehicle-mounted camera Configuration setting information shown in FIG. 16 can be applied to perform the monitoring control (abnormality detection control and data collection and transmission control) described in FIG. 9 to FIG. 11 in which the vehicle-mounted camera 300B is used as the data source. In the example of FIG. 16, the monitoring control operations are performed on the single data source and the common transfer period is defined. However, the transfer period may be defined for each monitoring control operation.

FIG. 17 is a flow chart showing a processing flow of abnormality monitoring control based on the vehicle-mounted camera Configuration setting information.

As shown in FIG. 17, the monitoring control section 1236 acquires imaging information from the vehicle-mounted camera 300B (S133d). The monitoring control section 1236 performs image processing of determining whether the imaging information includes an abnormality detection target defined for each monitoring control operation or of calculating a distance to any imaged human or object to perform abnormality determination processing (S133e). When the result of the determination processing shows that no abnormality is detected (YES at S1335), the monitoring control section 1236 checks whether the abnormality notification flag is OFF (S1336). When the abnormality notification flag is ON (NO at S1336), the monitoring control section 1236 updates the abnormality notification flag to OFF (S1339). Alternatively, when the result of the determination processing at step S1335 shows that any abnormality is detected (NO at S1335), the monitoring control section 1236 updates the abnormality notification flag to ON (S1337). The monitoring control section 1236 performs processing of notifying the vehicle-mounted information terminal 300C based on the abnormality notification flag being ON (S1338).

The vehicle-mounted GW apparatus 100 according to Embodiment 1 selects the communication channel from the plurality of external communication schemes for each data source 300 and switches between the communication channels associated with each data source 300 depending on the communication connection state of each of the plurality of external communication schemes based on the priority setting in which the plurality of external communication schemes are arranged in the predetermined priority order. In this case, the switching of the communication channel includes not connecting to the vehicle exterior network over any communication channel other than the predetermined communication channel.

The data output from the data source 300 is monitored, and the data is transmitted to the vehicle exterior network over the communication channel selected for the data source 300. With this configuration, the data source 300 inside the mobile body such as the vehicle can be stably connected to the network outside the mobile body, and the communication channel appropriate for the data source 300 inside the mobile body can be selected to enable the connection to the network outside the mobile body.

In view of the communication state of each external communication scheme, upload to the service providing apparatus 500 can be stably performed in accordance with the data type from each data source 300. Also, large-volume data can be transmitted over a communication channel having a high communication rate to reduce the communication cost.

Since the data transmission to the service providing apparatus 500 can be performed at the transmission timing set for each data source 300, the amount of data uploaded to the vehicle exterior network can be reduced, and the destination can be switched in association with each of the data sources to transmit the data to each of the service providing apparatuses.

When the communication channel for each data source 300 is in the disconnected state at the transmission timing, the data for transmission is temporarily stored, and at the next transmission timing, re-transmission processing is performed for re-transmitting the data not transmitted at the previous transmission timing. This can prevent loss of data to be uploaded to the service providing apparatus 500.

The vehicle-mounted GW apparatus 100 performs the abnormality detection control independently of the upload of data to the vehicle exterior network and detects any data satisfying the monitoring rule. When any data satisfying the monitoring rule is detected, the vehicle-mounted GW apparatus 100 performs the notification processing of notifying the user via the output apparatus such as the display apparatus or speaker of the vehicle-mounted information terminal 300C. Thus, the detection of abnormality of the user or vehicle and the notification to the user can be performed without relying on external communication.

Embodiment 2

FIG. 18 is a diagram showing the configuration of networks inside and outside a vehicle to which a vehicle-mounted gateway apparatus 100 (hereinafter referred to as a vehicle-mounted GW apparatus) according to Embodiment 2 of the present invention is applied. The vehicle-mounted GW apparatus 100 according to Embodiment 2 is similar to that according to Embodiment 1. The vehicle-mounted GW apparatus 100 according to Embodiment 2 can connect to another mobile body (such as another mobile body including a communication device or another mobile body equipped with an vehicle-mounted GW apparatus 100A with or without human intervention) and to another externally connected device 600 other than a service providing apparatus 500 through networks outside the vehicle.

For example, the vehicle-mounted GW apparatus 100 can be mounted on each of a plurality of mobile bodies and those mobile bodies can cooperate with each other. As shown in FIG. 18, a first mobile body equipped with the vehicle-mounted GW apparatus 100 and a second mobile body equipped with the vehicle-mounted GW apparatus 100A can communicate with each other through wireless communication and cooperate with each other.

Description can be made by using the vehicle-mounted camera Configuration setting information shown in FIG. 16 as an example. For example, it is assumed that the first mobile body and the second mobile body move in association with each other. When the first mobile body moving side by side or ahead of the second mobile body senses any obstacle (including a human or a vehicle) during monitoring control, the first mobile body can directly transmit obstacle sensing information to the second mobile body through wireless communication to notify the second mobile body in real time. In this case, the communication connection Configuration setting information shown in FIG. 3 includes setting information related to both mobile bodies (such as the MAC address of the vehicle-mounted GW apparatus 100A), and the vehicle-mounted camera Configuration setting information shown in FIG. 16 includes setting information related to processing of transmitting sensing information to another registered vehicle-mounted GW apparatus 100 as control performed when an obstacle (including a human or a vehicle) is sensed. In the direct transmission of the obstacle sensing information to the second mobile body through wireless communication, as shown in FIG. 18, notification processing can be performed for notifying a user via the output apparatus such as the display apparatus or the speaker of the vehicle-mounted information terminal 300C of the first mobile body.

In Embodiment 2, in addition to the notification processing between the plurality of mobile bodies, the monitoring control section 1236 can perform assist processing to control the mobile body associated with abnormality detection. The vehicle-mounted GW apparatus 100 can perform processing of notification related to vehicle control or processing of output of a control signal related to vehicle control to the vehicle ECU (vehicle control apparatus) responsible for controlling the mobile body through the vehicle-mounted LAN 300D. The vehicle ECU can perform vehicle control such as stop of running, deceleration, and automatic avoidance operation of the steering wheel based on the notification output from the monitoring control section 1236, or perform vehicle control such as stop of running, deceleration, and automatic avoidance operation of the steering wheel based on the control signal output from the monitoring control section 1236. In the above example, when the first mobile body senses any obstacle, the vehicle-mounted GW apparatus 100 outputs a notification or control signal related to stop of running, deceleration, and automatic avoidance operation of the steering wheel to the vehicle ECU to assist in control of the first mobile body. Similarly, the vehicle-mounted GW apparatus 100A mounted on the second mobile body can assist in control of the second mobile body such as stop of running, deceleration, and automatic avoidance operation of the steering wheel based on the notification received from the first mobile body in synchronization with or independently of the vehicle control assisted by the first mobile body.

The monitoring rule used in the abnormality detection control according to Embodiment 2 is preset, for example in the vehicle-mounted camera Configuration setting information, and is previously associated with the notification or control signal related to vehicle control such as stop of running, deceleration, and automatic avoidance operation of the steering wheel for use in the assist processing.

In Embodiment 2, the vehicle-mounted GW apparatus 100 can connect to the externally connected device 600 through wireless communication. The externally connected device 600 is, for example, a portable terminal apparatus (for example, a tablet computer). As another example, the removable vehicle-mounted information terminal 300C having a wireless communication function may be used as the externally connected device 600.

The monitoring control section 1236 can perform notification processing of transmitting the information (which may include voice output from a speaker) related to the sensed obstacle as described above to the externally connected device 600. The processing of notification to the externally connected device 600 can be performed in synchronization with or independently of the assist processing described above.

FIG. 19 is a flow chart showing a processing flow of monitoring control and abnormality monitoring control performed for each data source according to Embodiment 2. It should be noted that the example of FIG. 19 shows the processing flow of abnormality monitoring control based on vehicle-mounted camera Configuration setting information.

The communication control section 123B acquires Configuration setting information of each data source 300 (S131). When any signal for completing monitoring control of the data source is absent (NO at S132), the communication control section 123B performs monitoring control based on the Configuration setting information set for each data source 300 (S133).

The monitoring control section 1236 acquires imaging information from the vehicle-mounted camera 300B (S133-1). The monitoring control section 1236 performs image processing of determining whether the imaging information includes an abnormality detection target defined for each monitoring control or of calculating a distance to any imaged human or object to perform abnormality determination processing (S133-2).

In this processing, according to Embodiment 2, sound information input to a vehicle-mounted microphone (sound collecting apparatus) connected to the vehicle-mounted GW apparatus 100 can be collected, and for example, the level of emergency or danger can be determined from the voice or voice volume of a user in the vehicle. Specifically, for the voice, the vehicle-mounted GW apparatus 100 can transmit the voice information to the service providing apparatus 500 (server having a voice recognition function) outside the vehicle and receive the result of voice recognition from the service providing apparatus 500. The service providing apparatus 500 can also perform processing of determining the level of emergency or danger based on the result of voice recognition and transmit the result of the determination of the level of emergency or danger to the vehicle-mounted GW apparatus 100.

When the result of the determination processing shows no abnormality (YES at S133-3), the monitoring control section 1236 checks whether an abnormality notification flag is OFF (S133-4). When the abnormality notification flag is ON (NO at S133-4), the monitoring control section 1236 updates the abnormality notification flag to OFF (S133-5). Alternatively, when the result of the determination processing at step S133-3 shows that any abnormality is detected (NO at step S133-3), the monitoring control section 1236 updates the abnormality notification flag to ON (S133-7). The monitoring control section 1236 performs processing of notification to the inside of the vehicle based on the abnormality notification flag being ON (S133-8).

The notification processing at step S133-8 includes processing of notifying the vehicle-mounted information terminal 300C according to Embodiment 1 described above and processing of notifying the vehicle control system. The processing of notifying the vehicle control system corresponds to the assist processing performed by the monitoring control section 1236 described above. The assist processing allows stop of running, deceleration of the mobile body, and automatic avoidance operation of the steering wheel as described above, and the level of emergency or danger determined based on the sound information can be reflected in that control of the mobile body. For example, when the level of emergency is "high," sudden braking can be performed to stop the running. When the level of emergency is "low," control can be performed such that a braking force smaller than sudden braking can be generated to stop the running. When the user's voice volume is larger than a predetermined value or the user's utterance includes emergency words such as "Watch out!," the level of emergency can be set to "high."

As notification processing to the outside of the vehicle, the vehicle-mounted GW apparatus 100 refers to the Configuration setting information (for example, vehicle-mounted camera Configuration setting information) and performs processing of notification based on the abnormality notification flag being ON to the other vehicle-mounted GW apparatus 100A outside the vehicle, the externally connected device 600, and/or the service providing apparatus 500 defined in the Configuration setting information.

At step S134, similarly to Embodiment 1 described above, data collection and transmission control is performed to transmit data collected from the data source 300 to the vehicle exterior network. However, at step S133-9, in the processing of notification to the outside of the vehicle based on the abnormality notification flag being ON, necessary data (for example, image or sound of the sensed obstacle) may be transmitted to the associated connection target outside the vehicle.

As described above, in Embodiment 2, in addition to the functions provided in Embodiment 1, the direct communication can be performed with the other vehicle-mounted GW apparatus 100A or the externally connected device 600 other than the service providing apparatus 500 to achieve cooperation outside the vehicle. For the communication with the other vehicle-mounted GW apparatus 100A or the externally connected device 600, similarly to Embodiment 1, communication connection Configuration setting information is defined to include priority setting in which a plurality of external communication schemes are arranged in a predetermined priority order. Thus, the vehicle-mounted GW apparatus 100 (communication channel selection section 1235) can switch between the communication channels associated with each of the data sources depending on the communication connection state of each of the plurality of external communication schemes based on the communication connection Configuration setting information to connect to the other vehicle-mounted GW apparatus 100A or the externally connected device 600.

Together with or independently of the cooperation outside the vehicle, the monitoring control section 1236 performs the abnormality determination processing and the assist processing of assisting in the control of the mobile body in accordance with the abnormality determination result such that the control of the mobile body can be automatically performed such as stop of running, deceleration, and automatic avoidance operation of the steering wheel in response to the determined abnormality.

A specific example to which Embodiment 2 is applied is now described. When the first mobile body is an unmanned vehicle (automatic operation vehicle), the second mobile body is a manned vehicle, the first mobile body and the second mobile body run together, and the vehicle-mounted GW apparatus 100 of the unmanned vehicle senses an obstacle (for example, a human), then the unmanned vehicle can perform processing of notifying (through image or sound) the manned vehicle or the externally connected device 600 held by a user who is operating the manned vehicle, and can automatically perform vehicle control such as stop of running or deceleration. This configuration can prevent an accident of the unmanned vehicle.

The externally connected device 600 can receive input of an instruction to control the mobile body in response to the sensed abnormality and transmit the received control instruction to the vehicle-mounted GW apparatus 100 of the unmanned vehicle. In other words, the unmanned vehicle can be remotely operated by the externally connected device 600 via the vehicle-mounted GW apparatus 100.

As another specific example, processing of notification can be performed to a single or a plurality of vehicles located within a predetermined distance range of a vehicle in which abnormality is sensed, and those neighboring vehicles can perform assist processing. For example, a vehicle having an accident can notify any vehicle near the accident site or any vehicle approaching the accident site of the occurrence of the accident, so that stop of running, deceleration of the vehicle, or avoidance operation can be performed manually by a user or automatically by assist processing. This can prevent second disaster involved in the accident or further damage from the accident.

While Embodiment 2 has been described, the vehicle-mounted gateway apparatus 100 can be configured as a vehicle-mounted gateway system. For example, the vehicle-mounted gateway system can be configured such that the communication device 110 and the control device 120 can be configured as separate apparatuses and interconnected to each other. The vehicle-mounted gateway system can also be configured such that the respective functional components of the control device 120 can be configured as individual processing apparatuses as appropriate.

Each of the functions of the control device 120 can be implemented by a program. A computer program previously provided for implementing each function can be stored on an auxiliary storage apparatus, the program stored on the auxiliary storage apparatus can be read by a control section such as a CPU to a main storage apparatus, and the program read to the main storage apparatus can be executed by the control section to perform the function of each component.

The program may be recorded on a computer readable recording medium and provided for the vehicle-mounted GW apparatus 100. Examples of the computer readable recording medium include optical disks such as a CD-ROM, phase-change optical disks such as a DVD-ROM, magneto-optical disks such as a Magnet-Optical (MO) disk and Mini Disk (MD), magnetic disks such as a floppy Disk® and removable hard disk, and memory cards such as a compact Flash®, smart media, SD memory card, and memory stick. Hardware apparatuses such as an integrated circuit (such as an IC chip) designed and configured specifically for the purpose of the present invention are included in the recording medium. A program for implementing each component can be provided from the vehicle exterior network to the vehicle-mounted GW apparatus 100 via the communication device 110 and installed.

While the embodiments of the present invention have been described, those embodiments are only illustrative and are not intended to limit the scope of the present invention. The novel embodiments can be implemented in various other forms, and various omissions, substitutions, and modifications can be made thereto without departing from the spirit or scope of the present invention. The embodiments and their variations are encompassed within the spirit or scope of the present invention and within the invention set forth in the claims and the equivalents thereof.

DESCRIPTION OF THE REFERENCE NUMERALS

100 VEHICLE-MOUNTED GATEWAY APPARATUS (VEHICLE-MOUNTED GW APPARATUS)
110 COMMUNICATION DEVICE
111 VEHICLE INTERIOR COMMUNICATION INTERFACE
112 VEHICLE EXTERIOR COMMUNICATION INTERFACE
120 CONTROL DEVICE
121 VEHICLE INTERIOR COMMUNICATION CONTROL SECTION
122 VEHICLE EXTERIOR COMMUNICATION CONTROL SECTION
123 GATEWAY CONTROL SECTION (GW CONTROL SECTION)

123A NETWORK CONTROL SECTION
1231 ROUTING CONTROL SECTION
1232 PROTOCOL CONVERSION SECTION
1233 SECURITY SECTION
123B COMMUNICATION CONTROL SECTION
1234 COMMUNICATION STATE MONITORING SECTION
1235 COMMUNICATION CHANNEL SELECTION SECTION
1236 MONITORING CONTROL SECTION
1237 CONFIGURATION SETTING CONTROL SECTION
123C STORAGE SECTION
300 DATA SOURCE
300A SENSOR DEVICE
300B VEHICLE-MOUNTED CAMERA
300C VEHICLE-MOUNTED INFORMATION TERMINAL
300D VEHICLE-MOUNTED LAN
400 PORTABLE INFORMATION TERMINAL
500 SERVICE PROVIDING APPARATUS
600 EXTERNALLY CONNECTED DEVICE

The invention claimed is:

1. A vehicle-mounted gateway apparatus connected to a plurality of data sources within a vehicle and connectable to a network outside the vehicle, comprising:
   a communication device including an external communication interface for connection to the network outside the vehicle with each of a plurality of different external communication schemes and an internal communication interface for connection to each of the plurality of data sources; and
   a control device configured to transmit data collected from each of the data sources through the internal communication interface to the network outside the vehicle,
   wherein the control device includes:
      a communication control section configured to perform communication connection to the network outside the vehicle with each of the plurality of external communication schemes;
      a storage section storing configuration information set for each of the data sources;
      a communication channel selection section configured to select a communication channel from the plurality of external communication schemes for each of the data sources; and
      a monitoring control section configured to monitor data output from each of the data sources and to transmit the data to the network outside the vehicle over a selected one of the communication channels associated with the data source,
   the configuration information includes communication connection configuration setting information including priority setting in which the plurality of external communication schemes are arranged in a predetermined priority order, and
   the communication channel selection section is configured to switch between the communication channels associated with each of the data sources depending on a communication connection state of each of the plurality of external communication schemes based on the communication connection configuration setting information,
   wherein the configuration information includes transmission timing setting information related to a transmission timing of the data to the network outside the vehicle for each data source and destination setting information in which destinations of a plurality of service providing apparatuses connected to the network outside the vehicle are set for the respective data sources, and
   the monitoring control section is configured to transmit the data to the service providing apparatus at the transmission timing set for each of the data sources and to switch the destination in association with each of the data sources to transmit the data to the service providing apparatus,
   wherein the monitoring control section is configured to store the data temporarily in the storage section when the communication channel for each of the data sources is in a disconnected state at the transmission timing, and at the next transmission timing, to perform re-transmission processing of re-transmitting the data not transmitted at the previous transmission timing.

2. The vehicle-mounted gateway apparatus according to claim 1, wherein the configuration information includes monitoring control information for monitoring the data output from each of the data sources based on a predetermined monitoring rule, and
   the monitoring control section is configured to detect the data satisfying the monitoring rule independently of upload of the data to the network outside the vehicle, and, when the data satisfying the monitoring rule is detected, to perform notifying processing of notifying a user through a display apparatus or an output apparatus placed within the vehicle and connected to the internal communication interface.

3. The vehicle-mounted gateway apparatus according to claim 1, wherein the internal communication interface is connected to the data sources with a plurality of internal communication schemes, each of the internal communication schemes being associated with a different one of the data sources.

4. The vehicle-mounted gateway apparatus according to claim 1, wherein the configuration information includes destination setting information in which each destination of a vehicle-mounted gateway apparatus of another vehicle or an externally connected device connected to the network outside the vehicle is set for each of the data sources,
   the configuration information includes monitoring control information for monitoring the data output from each of the data sources based on a predetermined monitoring rule, and
   the monitoring control section is configured to detect the data satisfying the monitoring rule, and, when the data satisfying the monitoring rule is detected, to perform notifying processing of notifying the vehicle-mounted gateway apparatus of the other vehicle or the externally connected device connected to the external communication interface.

5. The vehicle-mounted gateway apparatus according to claim 4, wherein the monitoring control section is configured to, when the notification of detection of the data satisfying the monitoring rule is received in the other vehicle, perform processing of notification related to control of the vehicle or processing of output of a control signal related to control of the vehicle preset for the monitoring rule to a vehicle control apparatus connected to the internal communication interface.

6. The vehicle-mounted gateway apparatus according to claim 1, wherein the data source includes a vehicle control apparatus configured to control the vehicle, the configuration information includes monitoring control information for monitoring the data output from each of the data sources based on a predetermined monitoring rule, and the monitoring control section is configured to detect the data satisfying the monitoring rule and, when the data satisfying the monitoring rule is detected, to perform processing of notification related to control of the vehicle or processing of output of a control signal related to control of the vehicle preset for the monitoring rule to the vehicle control apparatus connected to the internal communication interface.

7. A vehicle-mounted gateway system connected to a plurality of data sources within a vehicle and connectable to a network outside the vehicle, comprising:

an external communication interface section for connection to the network outside the vehicle with each of a plurality of different external communication schemes;

an internal communication interface section for connection to each of the plurality of data sources;

a control section configured to transmit data collected from each of the data sources through the internal communication interface to the network outside the vehicle; and a storage section storing configuration information set for each of the data sources;

wherein the control section includes:
a communication control section configured to perform communication connection to the network outside the vehicle with each of the plurality of external communication schemes;

a communication channel selection section configured to select a communication channel for each of the data sources from the plurality of external communication schemes; and a monitoring control section configured to monitor data output from each of the data sources and to transmit the data to the network outside the vehicle over a selected one of the communication channels associated with the data source, the configuration information includes communication connection configuration setting information including priority setting in which the plurality of external communication schemes are arranged in a predetermined priority order, and the communication channel selection section is configured to switch between the communication channels associated with each of the data sources depending on a communication connection state of each of the plurality of external communication schemes based on the communication connection configuration setting information, wherein the configuration information includes transmission timing setting information related to a transmission timing of the data to the network outside the vehicle for each data source and destination setting information in which destinations of a plurality of service providing apparatuses connected to the network outside the vehicle are set for the respective data sources, and the monitoring control section is configured to transmit the data to the service providing apparatus at the transmission timing set for each of the data sources and to switch the destination in association with each of the data sources to transmit the data to the service providing apparatus, wherein the monitoring control section is configured to store the data temporarily in the storage section when the communication channel for each of the data sources is in a disconnected state at the transmission timing, and at the next transmission timing, to perform re-transmission processing of re-transmitting the data not transmitted at the previous transmission timing.

8. A vehicle-mounted gateway apparatus connected to a plurality of data sources within a vehicle and connectable to a network outside the vehicle, comprising:

a communication device including an external communication interface for connection to the network outside the vehicle with each of a plurality of different external communication schemes and an internal communication interface for connection to each of the plurality of data sources; and a control device configured to transmit data collected from each of the data sources through the internal communication interface to the network outside the vehicle, wherein the control device includes:
a communication control section configured to perform communication connection to the network outside the vehicle with each of the plurality of external communication schemes;

a storage section storing configuration information set for each of the data sources;

a communication channel selection section configured to select a communication channel from the plurality of external communication schemes for each of the data sources; and a monitoring control section configured to monitor data output from each of the data sources and to transmit the data to the network outside the vehicle over a selected one of the communication channels associated with the data source, the configuration information includes communication connection configuration setting information including priority setting in which the plurality of external communication schemes are arranged in a predetermined priority order, and the communication channel selection section is configured to switch between the communication channels associated with each of the data sources depending on a communication connection state of each of the plurality of external communication schemes based on the communication connection configuration setting information, wherein the configuration information includes destination setting information in which each destination of a vehicle-mounted gateway apparatus of another vehicle or an externally connected device connected to the network outside the vehicle is set for each of the data sources, the configuration information includes monitoring control information for monitoring the data output from each of the data sources based on a predetermined monitoring rule, and the monitoring control section is configured to detect the data satisfying the monitoring rule, and, when the data satisfying the monitoring rule is detected, to perform notifying processing of notifying the vehicle-mounted gateway apparatus of the other vehicle or the externally connected device connected to the external communication interface, wherein the monitoring control section is configured to, when the notification of detection of the data satisfying the monitoring rule is received in the other vehicle, perform processing of notification related to control of the vehicle or processing of output of a control signal related to control of the vehicle preset for the monitoring rule to a vehicle control apparatus connected to the internal communication interface.

9. A vehicle-mounted gateway system connected to a plurality of data sources within a vehicle and connectable to a network outside the vehicle, comprising:
- an external communication interface section for connection to the network outside the vehicle with each of a plurality of different external communication schemes;
- an internal communication interface section for connection to each of the plurality of data sources;
- a control section configured to transmit data collected from each of the data sources through the internal communication interface to the network outside the vehicle; and
- a storage section storing configuration information set for each of the data sources;

wherein the control section includes:
- a communication control section configured to perform communication connection to the network outside the vehicle with each of the plurality of external communication schemes;
- a communication channel selection section configured to select a communication channel for each of the data sources from the plurality of external communication schemes; and
- a monitoring control section configured to monitor data output from each of the data sources and to transmit the data to the network outside the vehicle over a selected one of the communication channels associated with the data source, the configuration information includes communication connection configuration setting information including priority setting in which the plurality of external communication schemes are arranged in a predetermined priority order, and the communication channel selection section is configured to switch between the communication channels associated with each of the data sources depending on a communication connection state of each of the plurality of external communication schemes based on the communication connection configuration setting information, wherein the configuration information includes destination setting information in which each destination of a vehicle-mounted gateway apparatus of another vehicle or an externally connected device connected to the network outside the vehicle is set for each of the data sources, the configuration information includes monitoring control information for monitoring the data output from each of the data sources based on a predetermined monitoring rule, and the monitoring control section is configured to detect the data satisfying the monitoring rule, and, when the data satisfying the monitoring rule is detected, to perform notifying processing of notifying the vehicle-mounted gateway apparatus of the other vehicle or the externally connected device connected to the external communication interface, wherein the monitoring control section is configured to, when the notification of detection of the data satisfying the monitoring rule is received in the other vehicle, perform processing of notification related to control of the vehicle or processing of output of a control signal related to control of the vehicle preset for the monitoring rule to a vehicle control apparatus connected to the internal communication interface.

* * * * *